United States Patent
Iwakura

(10) Patent No.: US 10,193,817 B2
(45) Date of Patent: Jan. 29, 2019

(54) METHOD, AND NETWORK SYSTEM

(71) Applicant: FUJITSU LIMITED, Kawasaki-shi, Kanagawa (JP)

(72) Inventor: Hirokazu Iwakura, Adachi (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 15/183,931

(22) Filed: Jun. 16, 2016

(65) Prior Publication Data
US 2017/0034065 A1 Feb. 2, 2017

(30) Foreign Application Priority Data

Jul. 27, 2015 (JP) ................... 2015-147763

(51) Int. Cl.
*H04L 12/823* (2013.01)
*H04L 12/801* (2013.01)
*H04L 12/841* (2013.01)

(52) U.S. Cl.
CPC ............ *H04L 47/32* (2013.01); *H04L 47/115* (2013.01); *H04L 47/17* (2013.01); *H04L 47/283* (2013.01)

(58) Field of Classification Search
CPC ..... H04L 47/32; H04L 47/283; H04L 47/115; H04L 47/17
See application file for complete search history.

(56) References Cited

U.S. PATENT DOCUMENTS

| 2002/0194310 | A1* | 12/2002 | Chu | ................... H04L 43/0852 709/219 |
|---|---|---|---|---|
| 2003/0022628 | A1* | 1/2003 | Mamiya | .................. H04L 1/16 455/67.11 |
| 2003/0107991 | A1* | 6/2003 | Tezuka | ................ H04L 12/6418 370/229 |
| 2007/0160073 | A1 | 7/2007 | Toumura et al. | |
| 2008/0031259 | A1* | 2/2008 | Zampiello | ............... H04L 45/00 370/395.52 |
| 2010/0238828 | A1* | 9/2010 | Russell | ............... H04L 43/0864 370/252 |

FOREIGN PATENT DOCUMENTS

| JP | 2007-184799 | 7/2007 |
|---|---|---|
| JP | 2007-282004 | 10/2007 |

* cited by examiner

*Primary Examiner* — Alex Skripnikov
*Assistant Examiner* — Sharmin Chowdhury
(74) *Attorney, Agent, or Firm* — Fujitsu Patent Center

(57) ABSTRACT

A method includes: recording information on a transmission source and a transmission destination in a received packet into first information; generating a copied packet by copying the received packet, the information of which is recorded in the first information, the first information being to be referred to when whether to generate a copied packet is determined based on a received packet; transmitting the generated copied packet to an analyzer device; receiving the copied packet; when it is determined that a predetermined condition is satisfied for the copied packet, transmitting instruction information for the copied packet to a first relay device among relay devices being a transmission source of the copied packet; and in response to reception of the instruction information, deleting, from the first information, the information on the transmission source and the transmission destination of the received packet used in the copying.

15 Claims, 32 Drawing Sheets

FIG. 6A
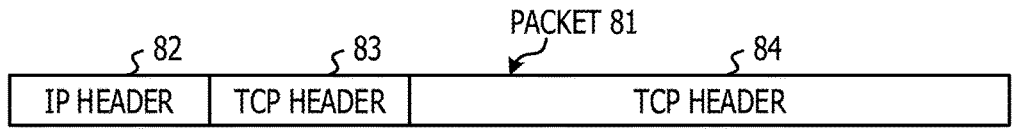
FIG. 6B
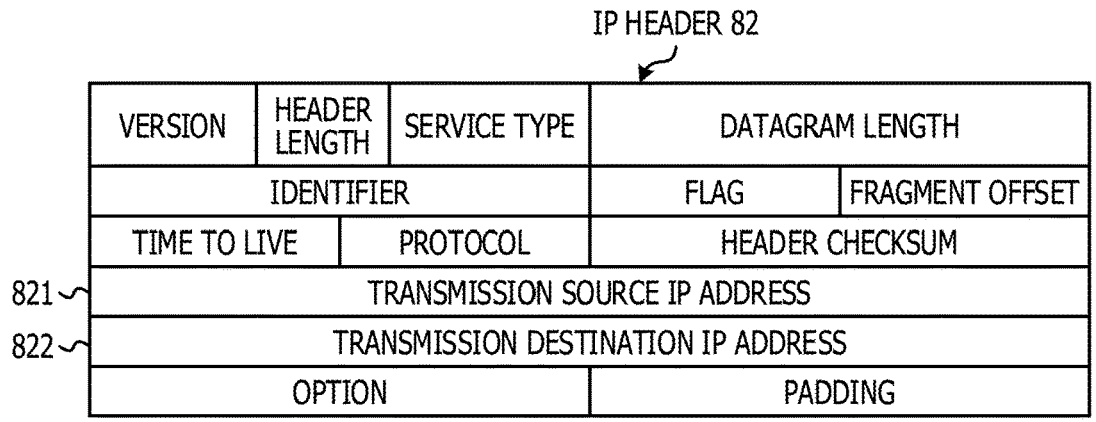
FIG. 6C
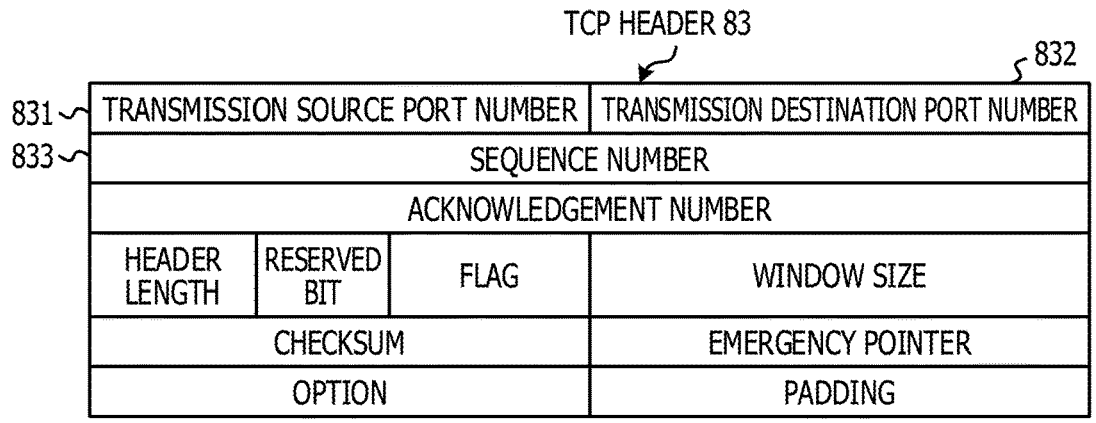
FIG. 6D
| TRANSMISSION DESTINATION IP ADDRESS | TRANSMISSION DESTINATION PORT NUMBER | TRANSMISSION SOURCE IP ADDRESS | TRANSMISSION SOURCE PORT NUMBER |
|---|---|---|---|
| 10.1.1.1 | 80 | 1.1.1.1 | 10000 |
| 10.1.1.2 | 8002 | 1.1.1.2 | 20000 |
| ⋮ | ⋮ | ⋮ | ⋮ |

| TRANSMISSION DESTINATION IP ADDRESS ⌐51 | TRANSMISSION DESTINATION PORT NUMBER ⌐52 | TRANSMISSION SOURCE IP ADDRESS ⌐53 | TRANSMISSION SOURCE PORT NUMBER ⌐54 | TCP SEQUENCE NUMBER ⌐55 | TIME INFORMATION ⌐56 |
|---|---|---|---|---|---|
| 10.1.1.1 | 80 | 1.1.1.1 | 10000 | 1000 | 10:1:1.000001 |
| 10.1.1.2 | 8002 | 1.1.1.2 | 20000 | 5000 | 10:2:2.000002 |
| ... | ... | ... | ... | ... | ... |
| 10.1.1.10 | 8080 | 1.1.10.2 | 30000 | 10000 | 10:10:10.0000010 |

50

METHOD, AND NETWORK SYSTEM

CROSS-REFERENCE TO RELATED APPLICATION

This application is based upon and claims the benefit of priority of the prior Japanese Patent Application No. 2015-147763, filed on Jul. 27, 2015, the entire contents of which are incorporated herein by reference.

FIELD

The embodiments discussed herein are related to a method, and a network system.

BACKGROUND

There has been known a technique of monitoring the state of a network between terminals by: copying a communication packet communicated between the terminals; sending the copied communication packet (hereinafter also referred to as "copied packet") to an analyzer device; and analyzing the received copied packet by the analyzer device. An example of the analysis is measurement of a round trip time (hereinafter also referred to as "RTT"). For example, a mirroring function of a switch provided between terminals may be used to copy a communication packet and send the copied packet to a predetermined analyzer device.

As examples of related arts, Japanese Laid-open Patent Publication Nos. 2007-184799 and 2007-282004 are known.

SUMMARY

According to an aspect of the invention, a method executed in a network system including a plurality of relay devices and an analyzer device, the method includes: receiving, by each of the plurality of relay devices, a packet; recording, by each of the plurality of relay devices, information on a transmission source and a transmission destination included in the received packet into first information with regard to the relay device; generating, by each of the plurality of relay devices, a copied packet by copying the received packet, the information of which is recorded in the first information, the first information being to be referred to when whether to generate a copied packet is determined based on a received packet; transmitting, by each of the plurality of relay devices, the generated copied packet to the analyzer device; receiving, by the analyzer device, the copied packet; when it is determined that a predetermined condition is satisfied for the copied packet, transmitting, by the analyzer device, instruction information for the copied packet to a first relay device among the plurality of relay devices being a transmission source of the copied packet; and in response to reception of the instruction information, deleting, by the first relay device, from the first information, the information on the transmission source and the transmission destination of the received packet used in the copying.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A, 6B, 6C, and 6D illustrate an example of a packet structure and a connection table according to an embodiment;

DESCRIPTION OF EMBODIMENTS

Figure 1:
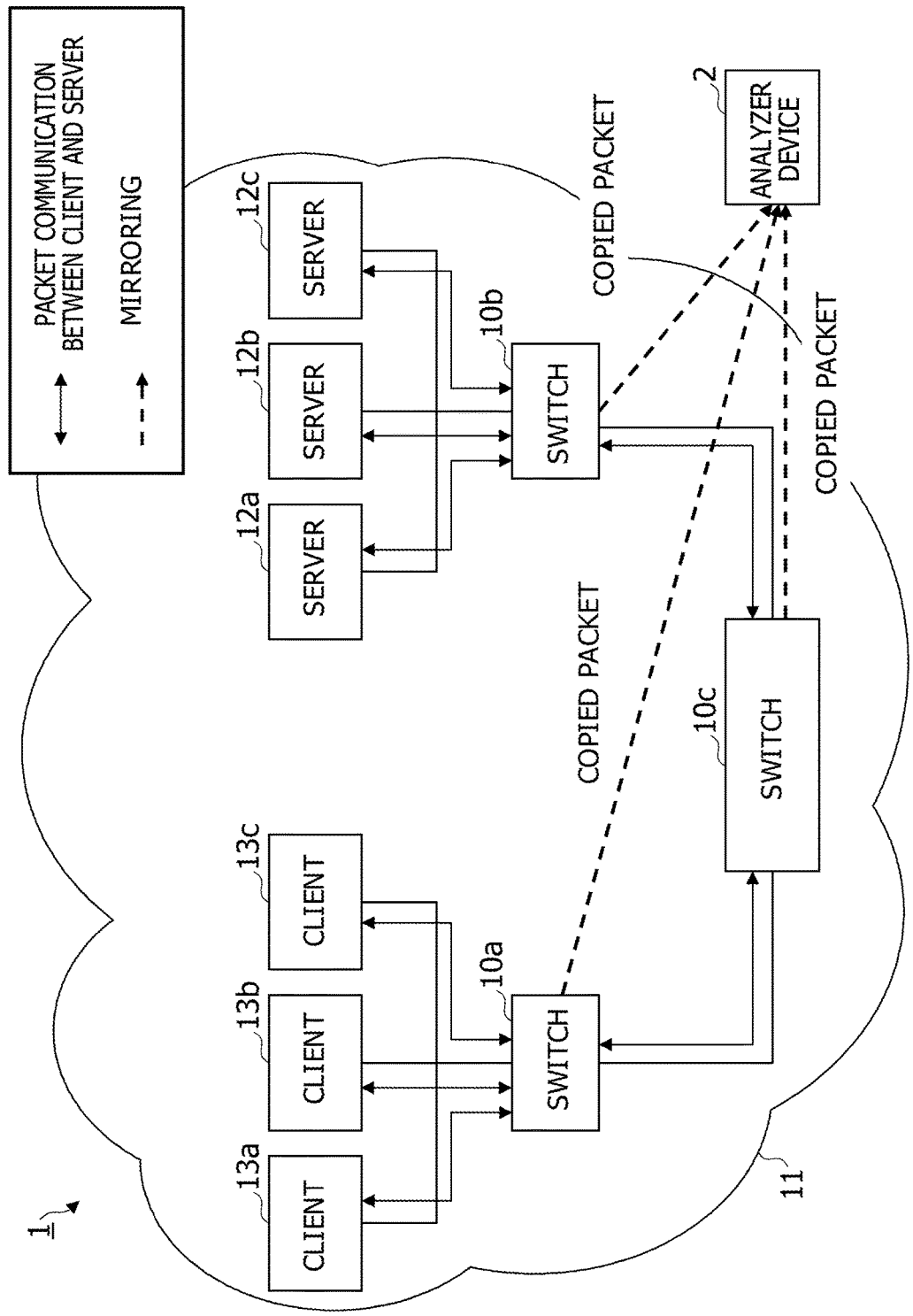
FIG. 1 illustrates an example of an overall configuration of an information processing system according to an embodiment.

In a network configuration where multiple switches exist among terminals, the same communication packet may pass through multiple switches. A copied packet may be sent to an analyzer device by a mirroring function of each of the switches where the same communication packet passes through. In this case, the same copied packet is sent from multiple switches to the analyzer device in duplicate, and this increases the traffic amount and requests a large capacity memory for the analyzer device.

For solving this problem, it may be considered that only a mirroring function of a specific switch is enabled to avoid the identical copied packet from being sent to the analyzer device. In this case, however, a communication packet used for the analysis may not reach the analyzer device since the communication packet does not pass through a specific switch. For example, in a network configuration where first and second switches exist among terminals, if only a mirroring function of the first switch is enabled, all packets including a communication packet used for the analysis are not sent from the second switch to the analyzer device. Thus, there is a possibility that the analyzer device may not acquire a communication packet used for the analysis thereof by the reason that a communication packet used for the analysis does not pass through the first switch.

Further, measured results of the RTT vary significantly depending on the position of the switch acquiring the communication packet. For example, in a communication between a data transmission terminal and a terminal which transmits an acknowledgement signal (ACK) to the data, RTT calculated based on a packet transferred by a switch located closer to the data transmission terminal is more precise than RTT calculated based on a packet transferred by a switch farther from the data transmission terminal. Therefore, it is preferable to acquire and send, to the analyzer device, a communication packet subjected to mirroring by a switch located closer to the data transmission terminal. Each of the two terminals may serve as a data transmission terminal and a terminal that transmits the acknowledgement (ACK) signal. Thus, a switch located closer to the data transmission terminal is not determined uniquely. Consequently, there is a problem that it is difficult to identify a switch that avoids the identical copied packet from being sent to the analyzer device and enhances precision of the RTT analysis by the analyzer device.

In one aspect, it is an object of the embodiment to identify a relay device that transmits a communication packet enhancing the RTT precision.

Hereinafter, the embodiment of the present disclosure is described with reference to the accompanying drawings. In the specification and drawings, duplicate description of a component having a substantially same function configuration is omitted by assigning the same reference numeral.

[Overall Configuration of Information Processing System]

First, a configuration example of an information processing system 1 according to an embodiment is described with reference to FIG. 1. FIG. 1 illustrates an example of an overall configuration of an information processing system according to an embodiment: FIG. 1 is an example of the information processing system 1 in which an analyzer device 2 according to the embodiment is used.

The information processing system 1 includes servers 12a, 12b, and 12c (hereinafter collectively referred to as "server 12") and clients 13a, 13b, and 13c (hereinafter collectively referred to as "client 13"). Servers 12a to 12c and clients 13a to 13c are coupled to each other via a network 11 such as a local area network (LAN). The analyzer device 2 fetches a packet communicated between servers 12a to 12c and clients 13a to 13c (hereinafter referred to as "communication packet"), and analyzes communication state of the information processing system 1 and quality of the network from the fetched packet.

Switches 10a, 10b, and 10C (hereinafter collectively referred to as "switch 10") are configured to switch on and off the communication between servers 12a to 12c and clients 13a to 13c. Switches 10a to 10c are coupled to a network interface card (NIC) 6 (see FIG. 2) of the analyzer device 2 via the network 11 such as LAN. Switches 10a to 10c are provided with a mirroring function that copies a packet communicated between servers 12a to 12c and clients 13a to 13c via switches 10a to 10c and inputted and outputted to a specific port and that transfers to the analyzer device 2. Hereinafter, the packet generated by copying is referred to as "copied packet". As switches 10a to 10c, for example, a LAN switch may be used. The switch 10 is an example of the relay device. The other example of the relay device includes a router.

The analyzer device 2 receives a packet communicated between servers 12a to 12c and clients 13a to 13c by using a mirroring function of switches 10a to 10c. Each of servers 12a to 12c is an example of the terminal that provides a service to clients 13a to 13c upon receiving a service request therefrom. Servers 12a to 12c include, for example, a central processing unit (CPU), a memory, a disk drive, and a NIC, which are not illustrated.

Clients 13a to 13c are an example of the terminal that requests a service to servers 12a to 12c and receives a service from servers 12a to 12c, and include, for example, a CPU, a memory, a disk drive, and a NIC, which are not illustrated.

The number of servers 12 and clients 13 included in the information processing system 1 are not limited to three and may be one or two or more. Although the number of switches 10 is not limited to three, a problem to be discussed later occurs when the number of switches 10 is two or more.

The server 12 and the client 13 also may serve as a data transmission terminal and a terminal that transmits the acknowledgement (ACK) signal to the data.

[Hardware Configuration of Analyzer Device 2]

Figure 2:
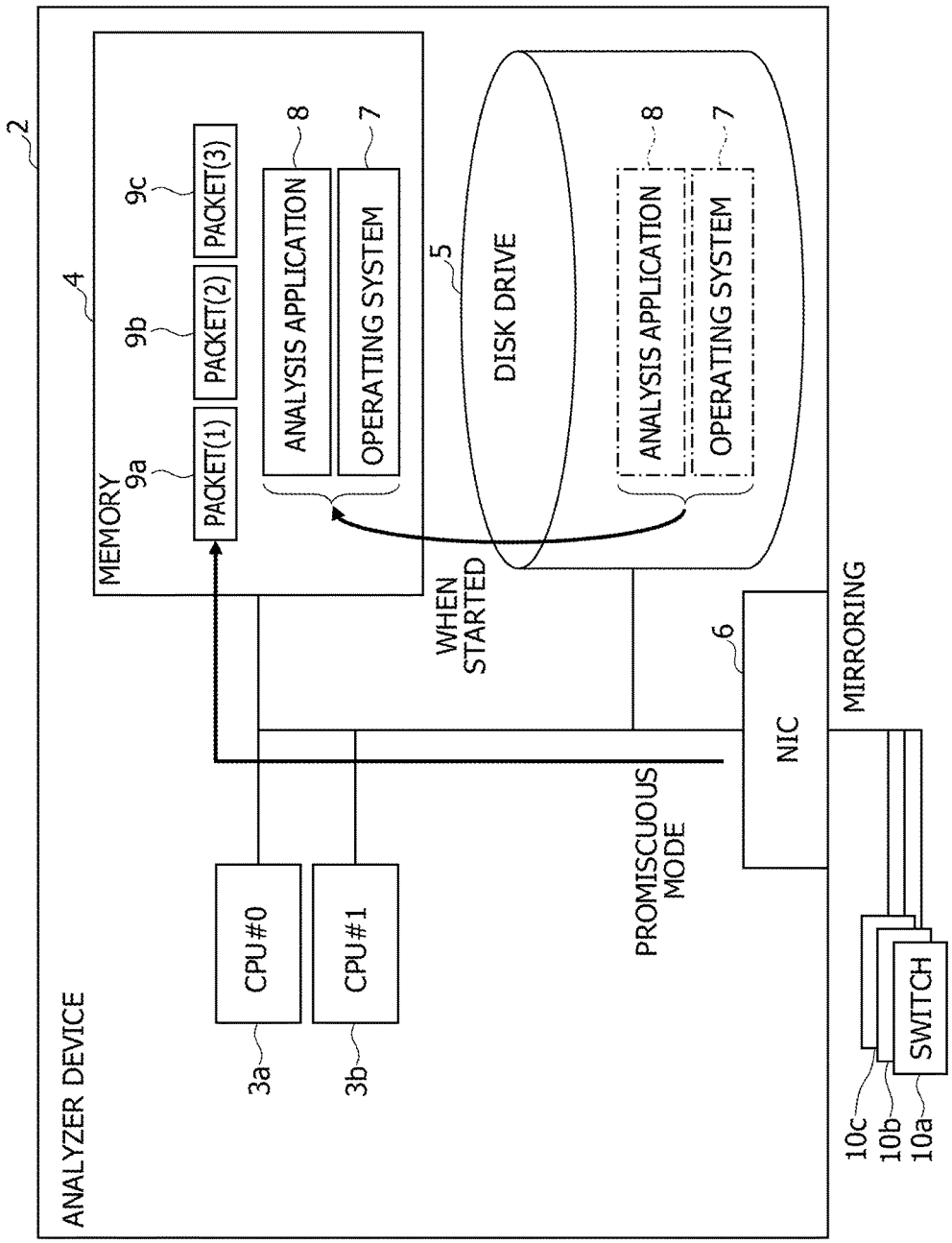
FIG. 2 illustrates an example of a hardware configuration of an analyzer device according to an embodiment.

Next, a configuration example of the hardware of the analyzer device 2 is described with reference to FIG. 2. FIG. 2 illustrates an example of a hardware configuration of an analyzer device according to an embodiment. The analyzer device 2 includes CPUs 3a, 3b, a memory 4, a disk drive 5, and a NIC 6. CPUs 3a, 3b are processors configured to perform various controls and operations.

CPUs 3a, 3b perform various processings by using an operating system 7 and an analysis application 8 on the memory 4. CPUs 3a, 3b analyze, for example, the communication state of the information processing system 1 by executing the analysis application 8. In FIG. 2, CPUs 3*a*, 3*b* are illustrated as CPU #0 and CPU #1.

The memory 4 is a temporary recording area such as, for example, a random access memory (RAM). The memory 4, for example, temporarily stores packets (1) 9*a* to (3) 9*c* analyzed by the analyzer device 2.

The disk drive 5 includes a recording area for recording data. A known hard disk drive (HDD) and solid state drive (SSD) may be used as the disk drive 5. The operating system 7 and analysis application 8 are stored in the disk drive 5 and loaded onto the memory 4 when the system is activated. The disk drive 5 stores data (not illustrated) such as various tables used by the analyzer device 2.

The NIC 6 is a network adapter for coupling the analyzer device 2 to the switch 10 via LAN and so on. An example of the NIC 6 includes a LAN card. The NIC 6 is adaptive to the promiscuous mode. The promiscuous mode is one of operation modes of the NIC 6 and is a mode for fetching and processing a packet not being a data packet destined thereto.

In the standard operation mode, the NIC 6 notifies reception of the packet to the operating system 7 only when a packet destined thereto is received. Meanwhile, in the promiscuous mode, the NIC 6 notifies arrival of a packet to the operating system 7 irrespective of the destination thereof, and the operating system 7 may receive a packet other than packets destined thereto.

A packet which has reached the NIC 6 is recorded into the memory 4 via the operating system 7 by using the promiscuous mode of the NIC 6 and is analyzed by the CPU 3. Operation of the NIC 6, especially data communication thereof with the CPU 3 is well known. Therefore, detailed description thereof is omitted.

The operating system 7 is software for managing an entire system of the analyzer device 2 and may be referred to as OS. A known operating system such as UNIX (trademark) and Windows (trademark) may be used as the operating system 7.

[Function Configuration of Analyzer Device]

Figure 3:
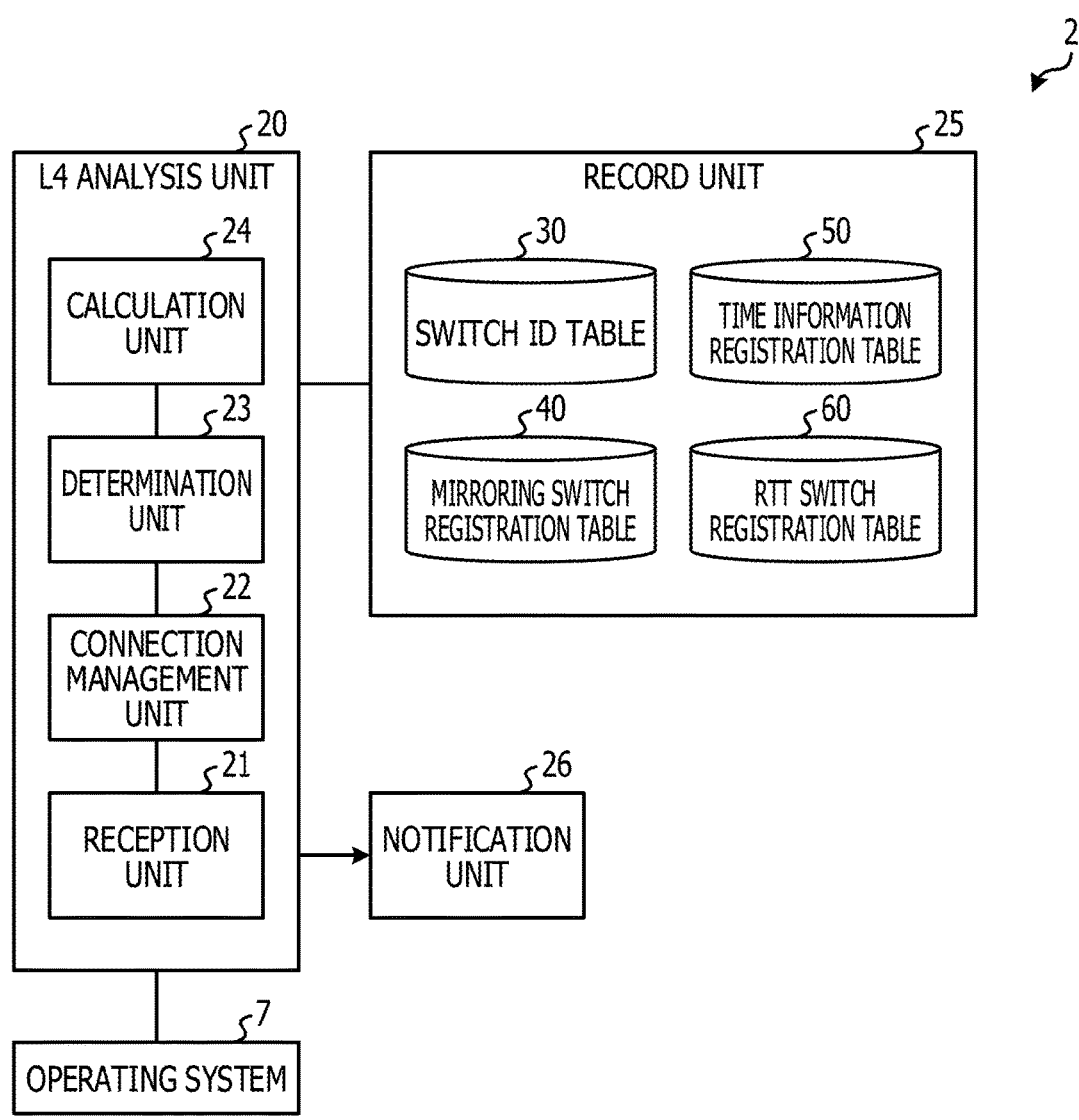
FIG. 3 illustrates an example of a function configuration of an analyzer device according to an embodiment.

Next, a function configuration example of the analyzer device 2 is described with reference to FIG. 3. FIG. 3 illustrates an example of a function configuration of an analyzer device according to an embodiment. The analyzer device 2 includes a L4 analysis unit 20 that functions by using the operating system 7, a record unit 25, and a notification unit 26. The L4 analysis unit 20 includes a reception unit 21, a connection management unit 22, a determination unit 23, and a calculation unit 24. The reception unit 21 is implemented, for example, by the NIC 6. The connection management unit 22, determination unit 23, and calculation unit 24 are implemented, for example, by the CPU 3.

The reception unit 21 receives a copied packet from the switch 10. The NIC 6 is an example of the reception unit that receives the packet. The connection management unit 22 manages connection establishment of the packet. When the received packet is a packet for establishing a connection, the determination unit 23 determines whether connection establishment information included in the packet is recorded in a mirroring switch registration table 40 of the analyzer device 2. Hereinafter, information in combination of information on the transmission source and transmission destination of the packet may be referred to as "connection information". An example of the connection information includes a transmission destination internet protocol (IP) address, a transmission destination port number, a transmission source IP address, and a transmission source port number. That is, the connection information may be connection establishment information, and transmission destination and transmission source IP addresses and port numbers thereof may be reverse to the connection establishment information.

The calculation unit 24 calculates a time (RTT) from transmission of the copied packet until reception of a packet (hereinafter referred to as "copied ACK packet") to which an ACK packet (acknowledgment packet) indicating that the copied packet is correctly transmitted is copied. The calculation unit 24 calculates the RTT from time information of a time point when the copied packet is received and time information of a time point when a copied ACK packet corresponding thereto is received.

The record unit 25 records information of various tables including the switch ID table 30, mirroring switch registration table 40, time information registration table 50, and RTT switch registration table 60.

After a copied packet, to which a packet for establishing a connection is copied, is first transmitted to the analyzer device 2, the notification unit 26 notifies instruction information (hereinafter referred to as "connection information deletion notification") to a switch 10, which has transmitted a copied packet to which a packet for establishing the same connection is copied, not to transmit the copied packet in duplicate. The notification unit 26 transmits the connection information deletion notification via the NIC 6.

[Function Configuration of Switch]

Figure 4:
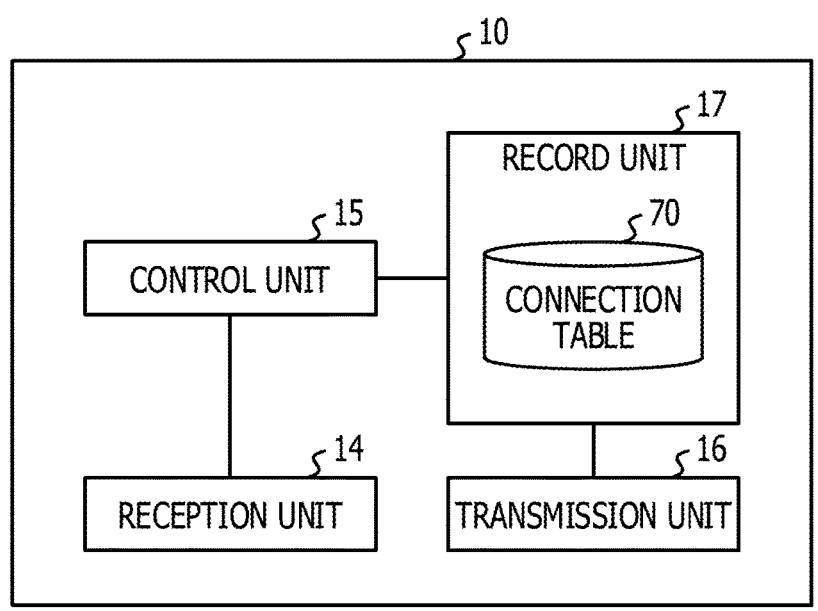
FIG. 4 illustrates an example of a function configuration of a switch according to an embodiment.

Next, a function configuration example of the switch 10 is described with reference to FIG. 4. FIG. 4 illustrates an example of a function configuration of a switch according to an embodiment. In this embodiment, the information processing system has a multi-layered switch structure, and each of switches 10 has the same function configuration. The switch 10 includes a reception unit 14, a control unit 15, a transmission unit 16, and a record unit 17.

Figure 5:
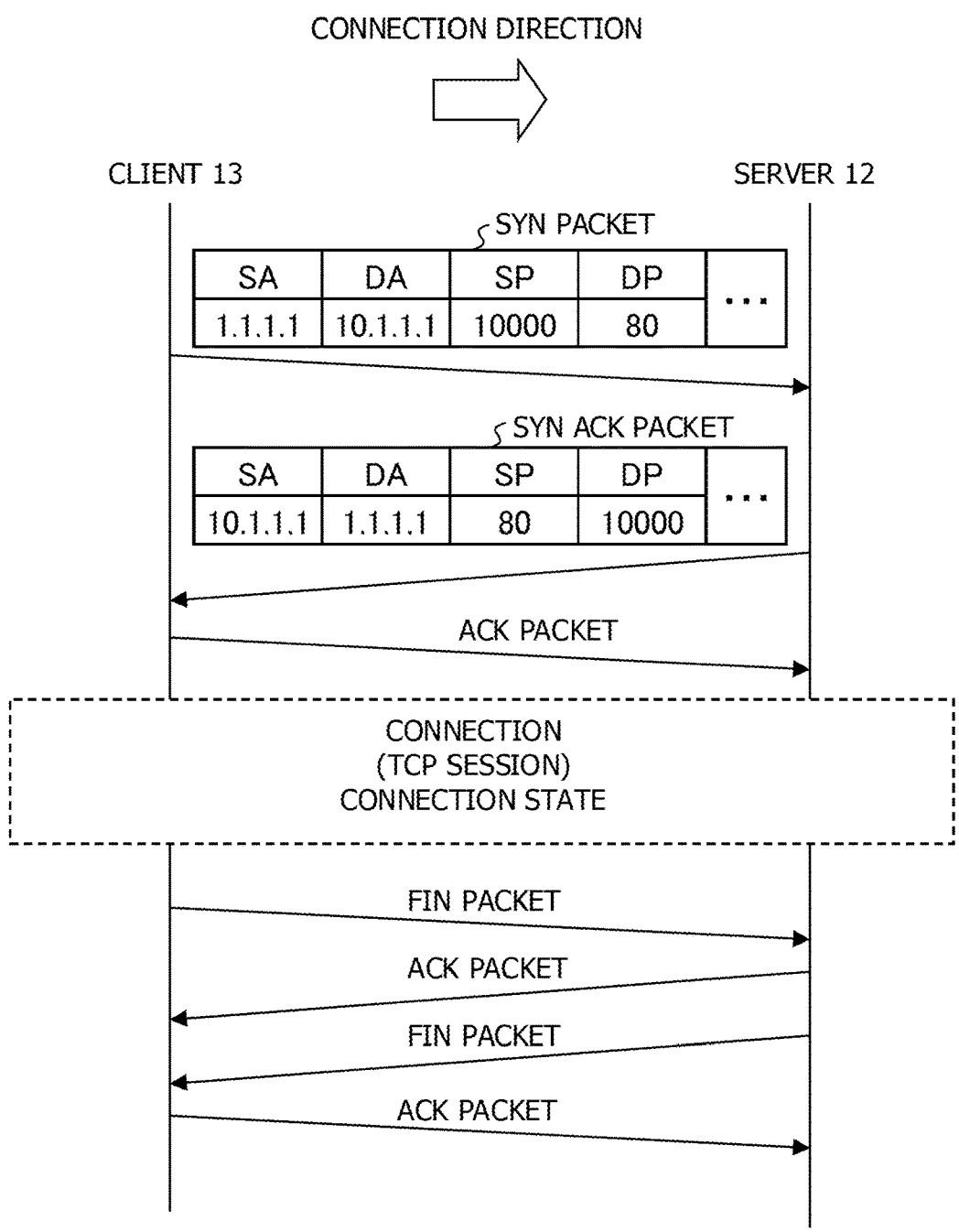
FIG. 5 illustrates establishment of a connection between a client and a server according to an embodiment.

The record unit 17 is configured to record connection establishment information included in the packet received by the reception unit 14 into the connection table 70. The connection table 70 is a table for recording the connection establishment information to be subjected to mirroring. FIG. 5 illustrates connection establishment between a client and a server according to an embodiment. For example, the connection table 70 records connection establishment information included in the packet for establishing a connection between the client 13 and the server 12 such as illustrated in FIG. 5. That is, the connection establishment information included in the packet for establishing the connection is connection information stored in the connection table 70. The connection table 70 is an example of a second table that is included in the packet for establishing the connection and records connection information indicating information on the transmission source and transmission destination.

FIG. 5 illustrates an embodiment of the connection establishment in the connection direction from the client 13 to the server 12. In establishing a connection, the connection is enabled after all the packets of SYN, SYN ACK, and ACK are communicated. The communication sequence of the packets communicated for establishment of a connection is known. Therefore, description thereof is omitted.

In FIG. 5, the transmission source IP address in the communication packet is represented by "SA", the transmission destination IP address is represented by "DA", the transmission source port number is represented by "SP", and the transmission destination port number is represented by "DA". The SYN packet includes each data of the transmission source IP address (SA) "1.1.1.1", the transmission destination IP address (DA) "10.1.1.1", the transmission source port number (SP) "10000", and transmission destination port number (DP) "80".

FIGS. 6A, 6B, 6C, and 6D illustrate an example of a packet structure and a connection table according to an embodiment. In an example of the data structure of the packet 81 illustrated in FIG. 6A, the packet 81 includes an IP header 82, a transmission control protocol (TCP) header 83, and a TCP data 84. FIG. 6B illustrates a data structure of the IP header 82, and FIG. 6C illustrates a data structure of the TCP header 83.

The transmission source IP address (SA) "1.1.1.1" of the SYN packet illustrated in FIG. 5 indicates data within the transmission source IP address 821 of FIG. 6B. The transmission destination IP address (DA) "10.1.1.1" of the SYN packet illustrated in FIG. 5 indicates data within the transmission destination IP address 822 of FIG. 6B. The transmission source port number (SP) "10000" of the SYN packet illustrated in FIG. 5 indicates the transmission source port number 831 of FIG. 6C. The transmission destination port number (DP) "80" of the SYN packet illustrated in FIG. 5 indicates the transmission source port number 832 of FIG. 6C.

As illustrated in FIG. 6D, the connection table 70 includes connection information of the transmission destination IP address 71, transmission destination port number 72, transmission source IP address 73, and transmission source port number 74. The transmission destination IP address 71 indicates an IP address of the transmission destination (connection destination: destination). The transmission destination port address 72 indicates a port address of the transmission destination (connection destination: destination). The transmission source IP address 73 indicates an IP address of the transmission source (connection source: source). The transmission source port number 74 indicates a port number of the transmission source (connection source: source).

For the SYN packet of FIG. 5, the record unit 17 records, in the connection table 70, "10.1.1.1" into the transmission destination IP address 71, "80" into the transmission destination port number 72, "1.1.1.1" into the transmission source IP address 73, and "10000" into the transmission source port number 74.

When the connection is established, the transmission source IP address (SA) "1.1.1.1", the transmission source port number (SP) "10000", transmission destination IP address (DA) "10.1.1.1", and the transmission destination port number (DP) "80" included in the SYN packet illustrated in FIG. 5 are one example of the connection establishment information.

The SYN ACK packet includes each data of the transmission source IP address (SA) "10.1.1.1", the transmission source port number (SP) "80", the transmission destination IP address (DA) "1.1.1.1", and the transmission destination port number (DP) "10000". Information on the transmission source and transmission destination included in the SYN ACK packet is reverse to information on a transmission source and transmission destination of the connection establishment information included in the SYN packet. Therefore, the two kinds of the information are not identical with each other. Thus, the connection establishment information is not included in the SYN ACK packet, and information on the transmission source and transmission destination included in the SYN ACK packet is not recorded into the connection table 70. However, information on the transmission source and transmission destination included in the SYN ACK packet is connection information logically same as he connection establishment information in the SYN packet.

In the embodiment, the establishment sequence of the TCP connection is described as an example of the connection establishment. However, the connection establishment is not limited to the TCP connection, and the connection establishment sequence may be implemented in accordance with the other communication protocol.

In the TCP connection, the transmission destination IP address, transmission destination TCP port number, transmission source IP address, and transmission source TCP port number are connection establishment information. The transmission destination IP address, transmission destination port number, transmission source IP address, and transmission source port number are one example of the connection information in combination of information on the transmission source and transmission destination.

The transmission unit 16 transmits the packet. The reception unit 14 receives the packet. When determined that connection information, which is logically identical with the connection establishment information included in the packet (hereinafter simply referred to "as identical with connection establishment information"), is recorded in the mirroring switch registration table 40 of the analyzer device 2, the reception unit 14 receives connection information deletion notification for deleting connection information from the connection table 70 of the transmission source switch 10. The control unit 15 is configured to control all switches.

[Tables]

Figure 7:
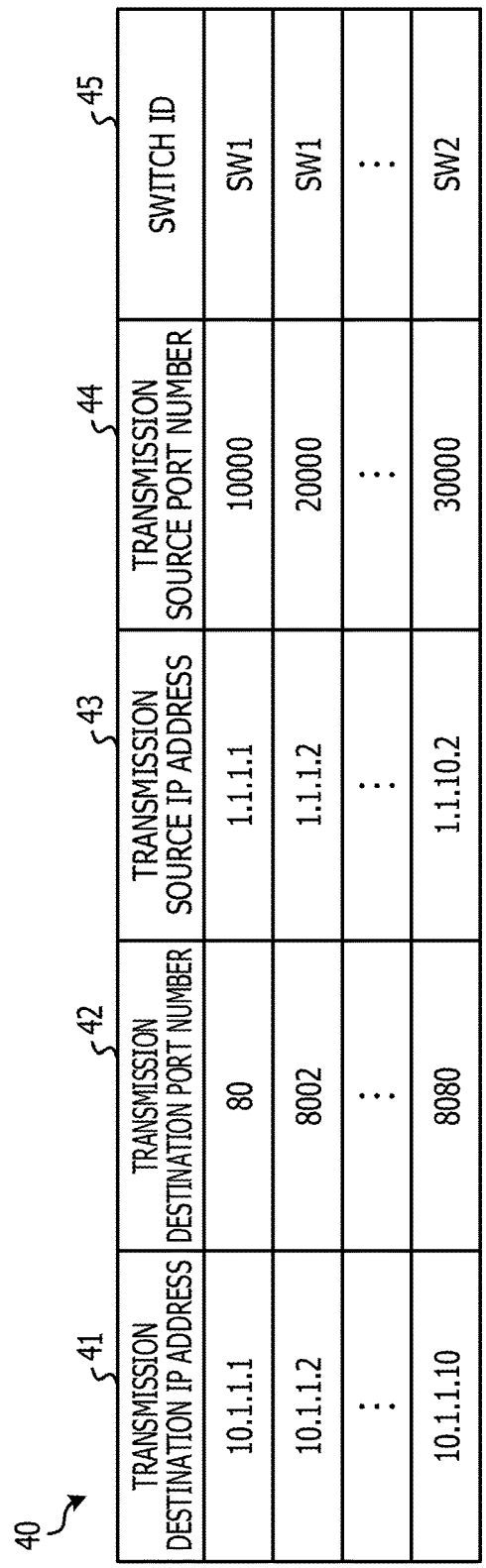
FIG. 7 illustrates an example of a mirroring switch registration table according to an embodiment.
Figure 8:
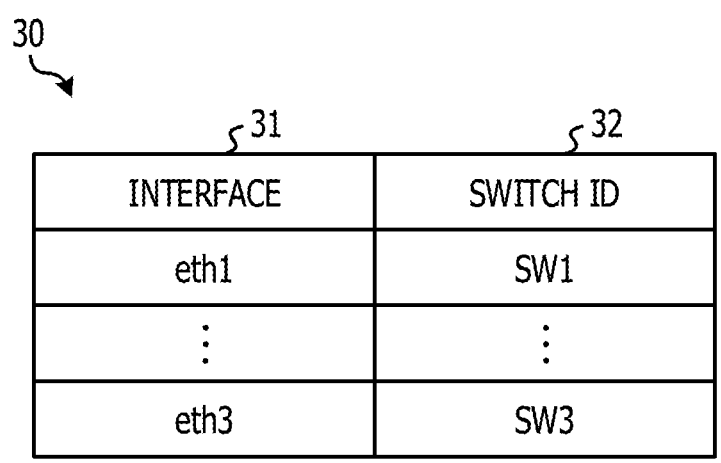
FIG. 8 illustrates an example of a switch ID table according to an embodiment.

The record unit 25 of the analyzer device 2 records connection establishment information included in the packet for establishing a connection into the mirroring switch registration table 40. FIG. 7 illustrates an example of the mirroring switch registration table 40. For example, connection establishment information included in the packet for establishing a connection is recorded in the transmission destination IP address 41, transmission destination port number 42, transmission source IP address 43, and transmission source port number 44 in the mirroring switch registration table 40. The mirroring switch registration table 40 records a switch ID 45 configured to identify a transmission source switch of a packet including the connection establishment information. The connection management unit 22 is configured to manage whether a copied packet is transferred to a physical port of the analyzer device 2. FIG. 8 illustrates an example of the switch ID table according to an embodiment. The record unit 25 prerecords the switch ID table 30 such as an example illustrated in FIG. 8. The switch ID table 30 is a table for transforming an interface 31 indicating a physical port of Ethernet (trademark) into the switch ID 32. For example, when a copied packet is inputted via interface of a physical port "eth 1" of the analyzer device 2, the record unit 25 selects SW1 of the switch ID 32 based on the switch ID table 30, and records SW1 into the switch ID 45 of the mirroring switch registration table 40. The mirroring switch registration table 40 is an example of a first table configured to record connection establishment information included in a packet for establishing a connection and identification information of the switch 10 of the transmission source of the received packet by associating with each other.

Figure 9:
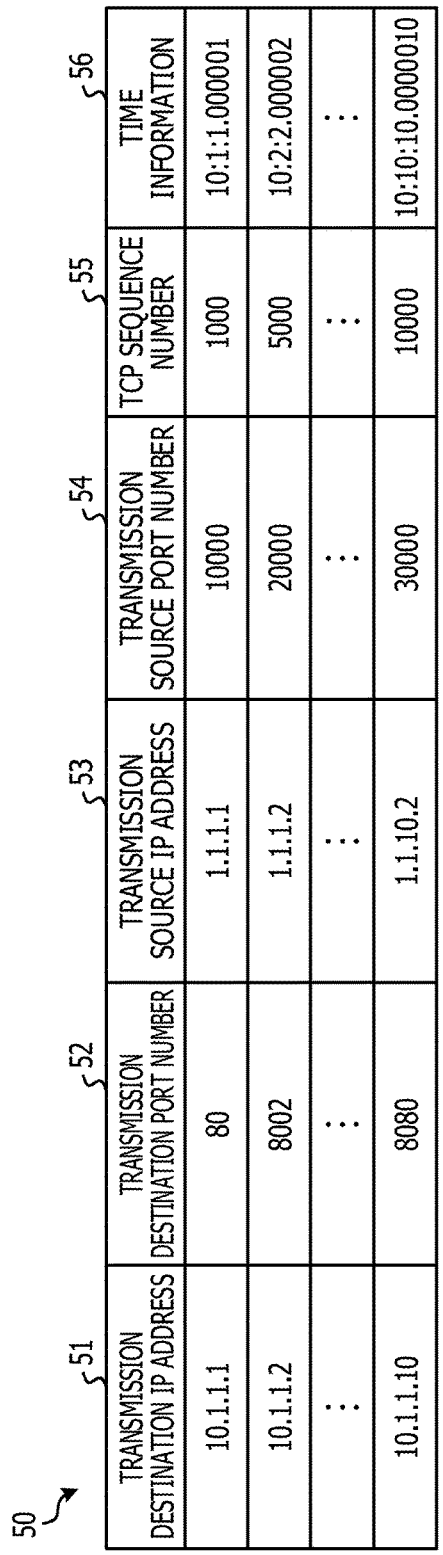
FIG. 9 illustrates an example of a time information registration table according to an embodiment.

The time information registration table 50 is configured to record time information of a time point when the analyzer device 2 acquires the copied packet. FIG. 9 illustrates an example of the time information registration table 50. The record unit 25 records connection information recorded in the mirroring switch registration table 40 into the transmission destination IP address 51, transmission destination port number 52, transmission source IP address 53 and transmission source port number 54 in the time information registration table 50. The record unit 25, for example, records the sequence number 833 (see FIG. 6C) of the copied packet into the TCP sequence number 55, and records the time point when the copied packet is received into the time information 56.

Figure 10:
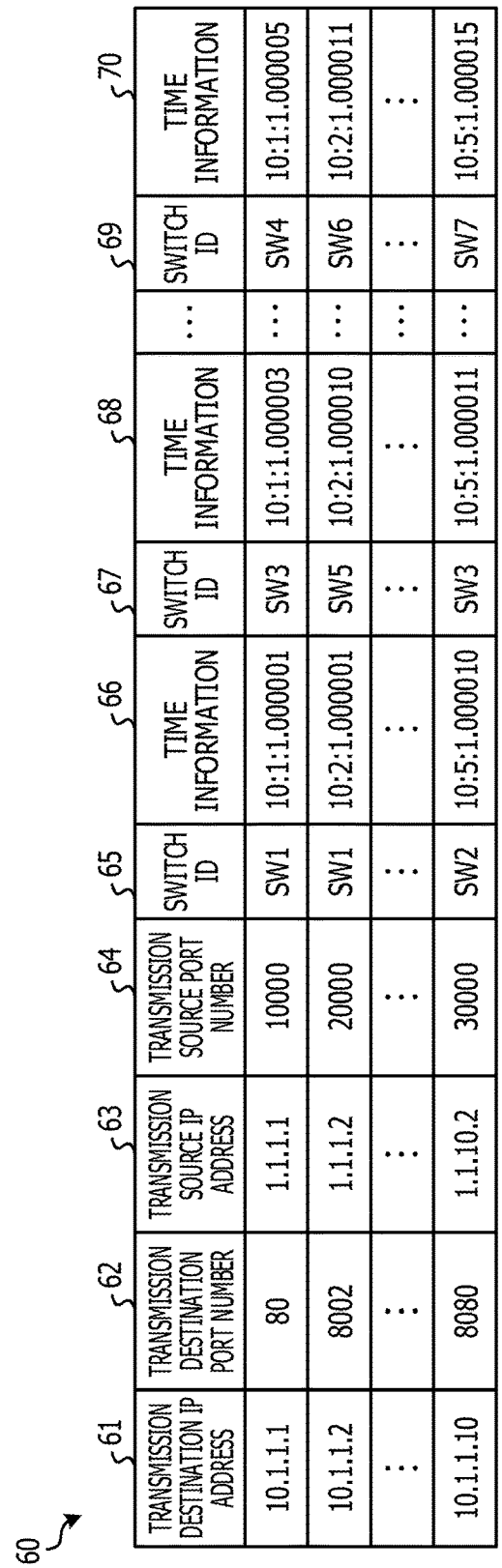
FIG. 10 illustrates an example of a RTT switch registration table according to an embodiment.

FIG. 10 illustrates an example of a RTT switch registration table according to an embodiment. The RTT switch registration table 60 of FIG. 10 records a time point when the copied packet passes through the switch 10 after connection establishment, for calculating the round trip time (RTT) of the packet. The record unit 25 records the connection establishment information into the transmission destination IP address 61, transmission destination port number 62, transmission source IP address 63 and transmission source port number 64 in the RTT switch registration table 60. The record unit 25 also records switch ID of each switch transferring each copied packet, (1) 65, switch ID (2) 67, . . . switch ID (3) 69, and time information of a time point when the packet passes each switch, (1) 66, time information (2) 68, . . . time information (N) 70.

[Calculation of RTT]

The analyzer device 2 measures data transfer packet acquisition time of the TCP protocol and ACK packet acquisition time of the data transfer packet in order to measure the RTT between the client 13 and the server 12. The ACK packet is an example of the acknowledgment packet. The analyzer device 2 calculates the RTT from a time difference between the data transfer packet acquisition time and ACK packet acquisition time.

Figure 11:
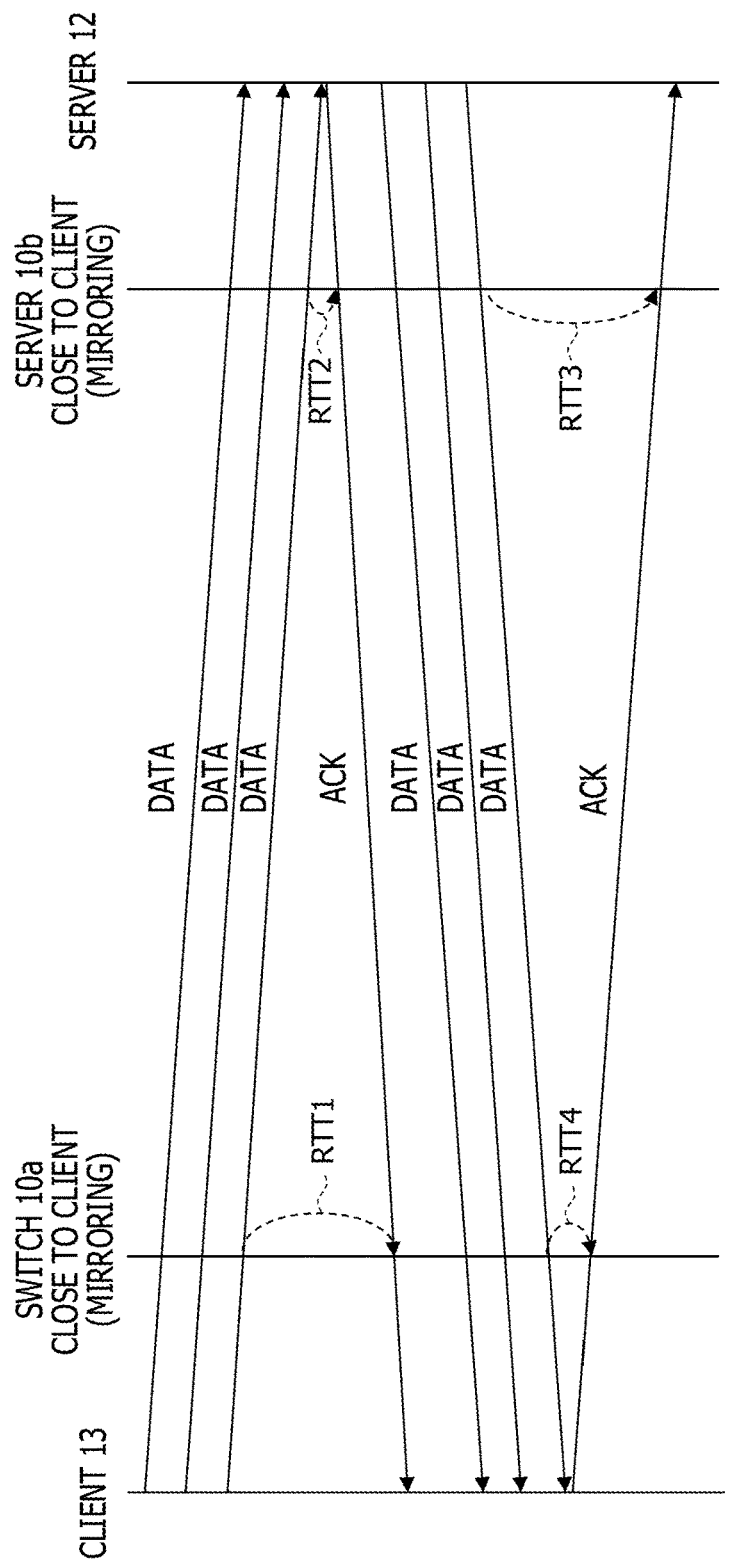
FIG. 11 is a diagram for illustrating calculation of the RTT according to an embodiment.

When there are multiple switches 10 subjected to mirroring, more precise RTT may be obtained if calculated based on the transmission time of a packet copied by a switch close to the client 13 or the server 12. FIG. 11 is a diagram for illustrating calculation of the RTT according to an embodiment. As an example, a case where an ACK packet is transmitted from the server 12 to a data transfer packet transmitted from the client 13 as illustrated in FIG. 11 is described. In this case, the value of RTT1 calculated from a packet copied through mirroring by a switch 10*a* close to the client 13 is closer to the value of the actual RTT than RTT2 calculated from a packet copied through mirroring by a switch 10*b* close to the server 12.

To the contrary, when the ACK packet is transmitted from the client 13 to the data transfer packet transmitted from the server 12, a value of RTT3 calculated from a packet copied through mirroring by a switch 10*b* is more precise than a value of RTT4 calculated from a packet copied through mirroring by a switch 10*a*.

In the multi-layered information processing system 1, each terminal includes functions of the client 13 and the server 12, which are operated simultaneously to build up a system. Therefore, it is difficult to select a switch closer to the client 13 or the server 12.

Figure 12:
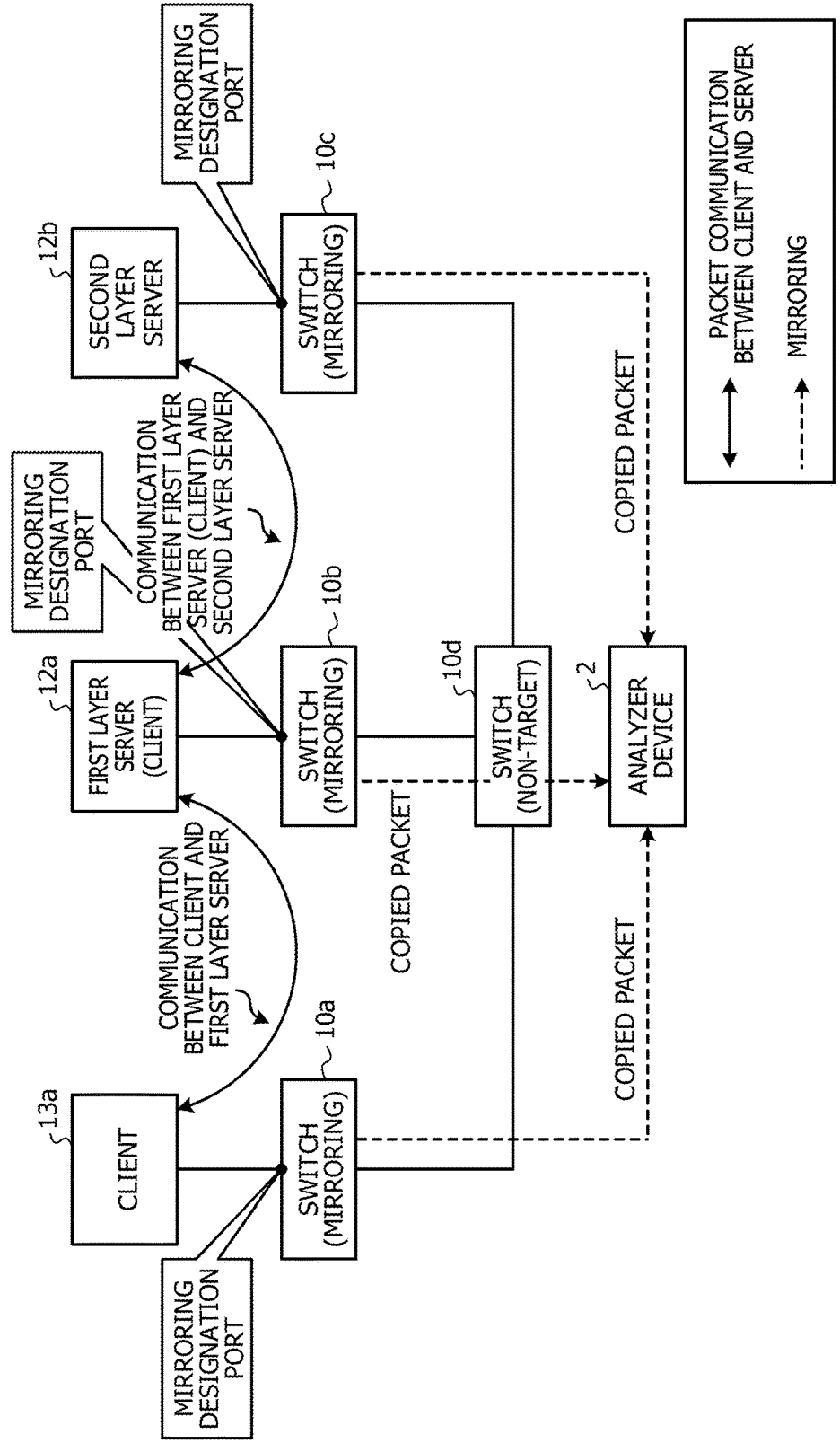
FIG. 12 illustrates an example of a configuration of a multi-layered information processing system.

FIG. 12 illustrates an example of a configuration of a multi-layered information processing system. Switches 10*a* to 10*c* (here, the switch 10*d* is a non-target switch) illustrated in FIG. 12 copies the packet in a unit of the physical port and transmits a copied packet to the analyzer device 2. For this reason, when mirroring is performed by switches 10*a* to 10*c*, copied identical packets may be transmitted from multiple switches 10*a* to 10*c* to the analyzer device 2 in duplicate. As a result, traffic amount of packets transferred to the analyzer device 2 increases beyond a packet reception capacity of the analyzer device 2, and thereby analysis by the analyzer device 2 may become difficult. For example, in FIG. 12, packets copied in the communication between the client 13*a* and the first layer server 12*a* are sent from switches 10*a* and 10*b* to the analyzer device 2 in duplicate. Packets copied in the communication between the first layer server 12*a* serving as a client and the second layer server 12*b* are sent from switches 10*b* and 10*c* to the analyzer device 2 in duplicate.

Figure 13:
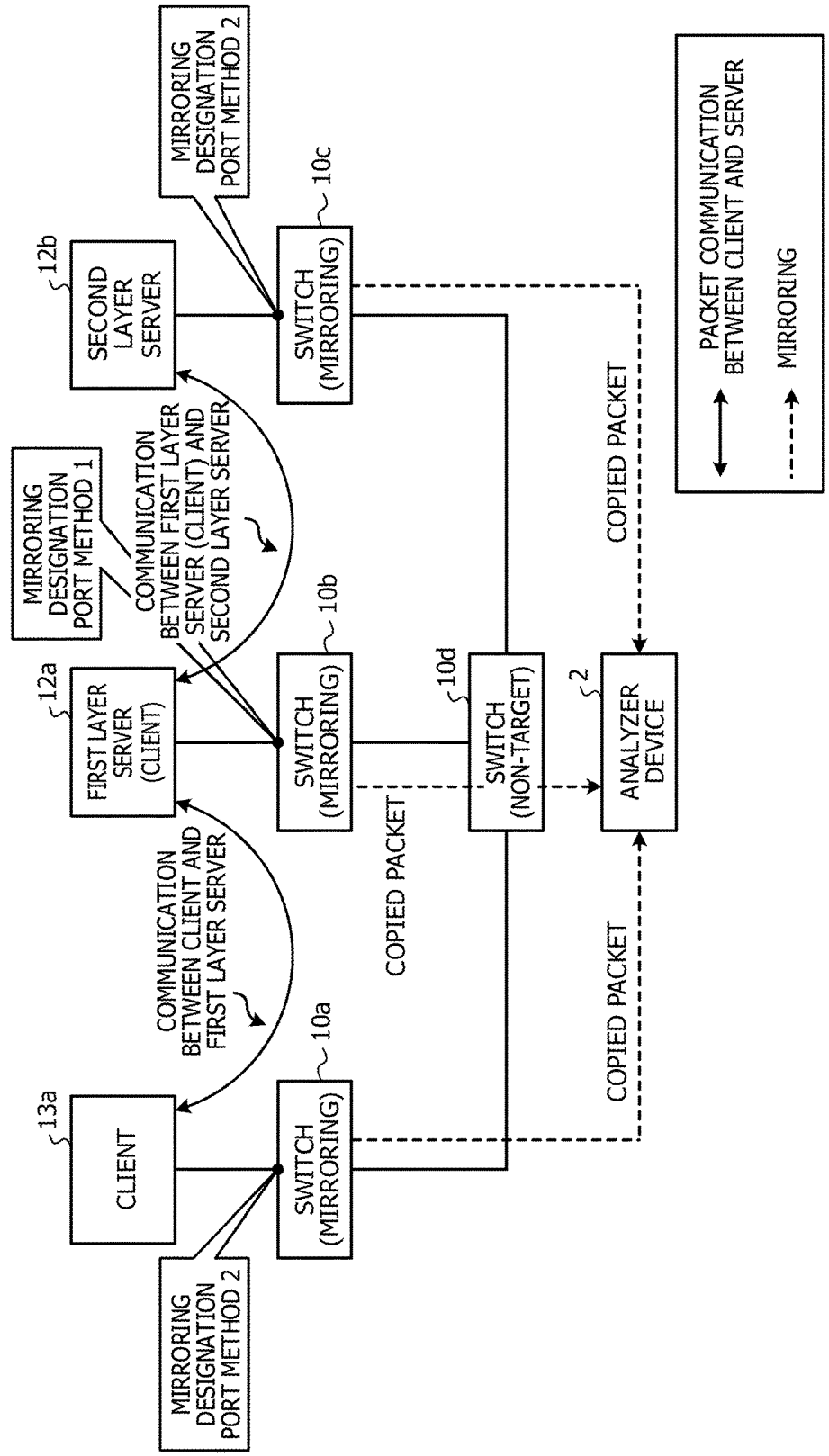
FIG. 13 illustrates an example of mirroring of a communication packet in a multi-layered information processing system.

For solving the problem, there is a method of reducing the traffic amount and the load of the analyzer device 2 by selecting a switch not generating duplicate packets from the communication path between the client 13 and the server 12. FIG. 13 illustrates an example of a mirroring of a communication packet in a multi-layered information processing system. As an example, an information processing system that, for example, comprises a client 13*a*, a first layer server 12*a*, and a second layer server 12*b* of FIG. 13 and communicates between the client 13*a* and the first layer server 12*a* and between the first layer server 12*a* and the second layer server 12*b* is described.

In the information processing system, the mirroring designation port method 1 of designating a switch for mirroring selects only a physical port of a switch 10*b* to which the first layer server 12*a* is coupled. Meanwhile, the mirroring designation port method 2 designates a port of a switch 10*a* to which the client 13*a* is coupled, and a port of a switch 10*c* to which the second layer server 12*b* is coupled.

In the above mirroring designation method, only a packet copied by a switch designated by any one of the mirroring designation port method 1 and mirroring designation port method 2 is transferred to the analyzer device 2. Thus, the RTT may be determined precisely by mirroring with a switch close to the client 13 or the server 12 without duplicating the packet.

Figure 14:
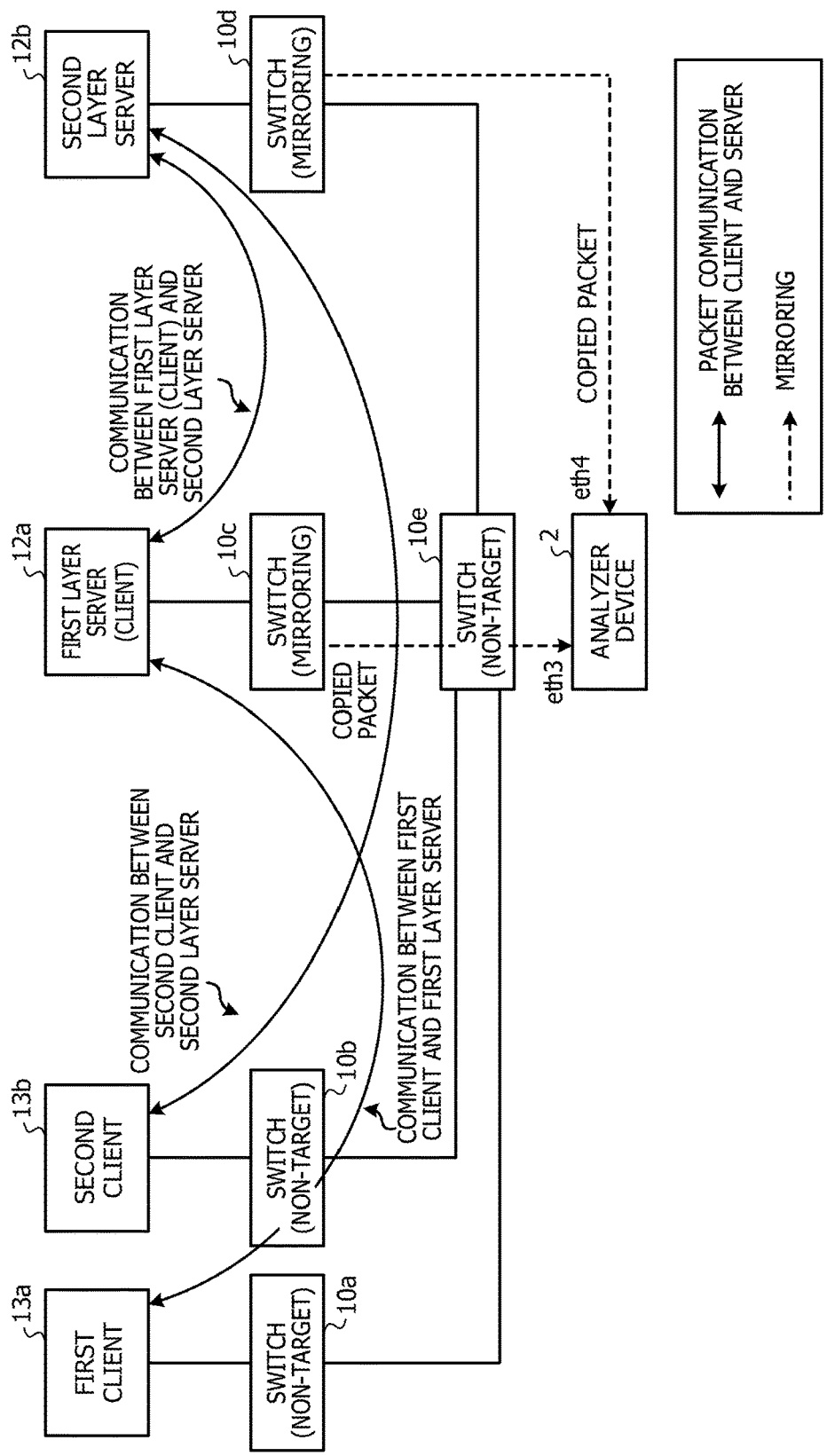
FIG. 14 illustrates an example of duplicated packets subjected to mirroring in a multi-layered information processing system.

However, as illustrated in FIG. 14, when multiple clients 13*a*, 13*b* are coupled and the communication path is different for each client, a problem of the traffic increase by packet duplication occurs. As an example, a case where two paths co-exist is described: i.e. in one path, communication between a first client 13*a* and a first layer server 12*a* and communication between a first layer server 12*a* and a second layer server 12*b* are performed, and in another path, communication between a second client 13*b* and the second layer server 12*b* is performed. In this case, when the mirroring designation port method 1 is performed, only a physical port of the switch 10*c* to which the first layer server 12*a* is coupled is designated for mirroring, and thereby communication between the second client 13*b* and the second layer server 12*b* is not mirrored.

Then, if a physical port of the switch 10*d* to which the second layer server 12*b* is coupled is also designated for mirroring, mirroring of communication between the second client 13*b* and second layer server 12*b* may become possible. In this case, communication between the first layer server 12*a* and second layer server 12*b* is mirrored by the switch 10*c* and switch 10*d*, and thereby a problem of the traffic increase by packet duplication occurs. Then, the following problems 1 and 2 are solved by packet acquisition methods according to the first to third embodiments.

[Problem 1]

In an information processing system 1 configured by multiple switches 10, identical packets are relayed by multiple relays. For this reason, to accurately determine the RTT with the data transfer packet and ACK packet, it is preferable to calculate the RTT based on a time difference between a data transfer packet mirrored by a switch 10 as much close as possible to the transmission source of the data transfer packet and an ACK packet thereof.

[Problem 2]

In monitoring a network of an information processing system 1 configured by multiple switches 10, when mirroring is performed by all switches 10 which have relayed packets, copied packets are duplicated and thereby communication traffic amount increases. For this reason, it is preferable to select a switch 10 for mirroring in order to avoid copied packets from being transmitted to the analyzer device 2 in duplicate.

In the information processing system according to this embodiment, a switch 10 compatible with the Software-Defined Network (SDN) is used. The switch 10 compatible with SDN sends out, for example, a mirroring target packet based on a combination (connection establishment information) of the transmission destination IP address, transmission destination TCP port number, transmission source IP address, and transmission source TCP port number, which are designated by the administrator as defaults. Then, the switch 10 saves the connection establishment information into the connection table 70 recorded by respective switches 10.

When the analyzer device 2 receives the copied SYN packet from the switch 10, the connection establishment information is recorded into the mirroring switch registration table 40. In the case of the SYN packet illustrated in FIG. 5, the mirroring switch registration table 40 records transmission destination IP address (DA) "10.1.1.1." in the transmission destination IP address 41, the transmission destination port number (DP) "80" in the transmission destination port number 42, the transmission source IP address (SA) "1.1.1.1" in the transmission source IP address 43, and the transmission source port number (SP) "10000" in the transmission source port number 44. The switch ID 45 records a switch ID "SW1" identified from the interface 31 through which the copied SYN packet is inputted.

However, when a failure occurs such as, for example, when a packet sent out from a switch 10 is lost before reaching the analyzer device 2, the analyzer device 2 may acquire the SYN ACK packet without acquiring the SYN packet. In this case, the SYN ACK packet serves as a packet for establishing a connection, and when the analyzer device 2 receives a copied SYN ACK packet from the switch 10, connection establishment information of the SYN ACK packet is recorded into the mirroring switch registration table 40.

That is, in this case, information on the transmission source and transmission destination included in the SYN ACK packet becomes the connection establishment information in place of the information on the transmission source ad transmission destination included in the SYN packet.

However, when recorded into the mirroring switch registration table 40, the information on the transmission source and transmission destination included in the SYN ACK packet is recorded with the server 12 as the transmission destination and the client 13 as the transmission source. For example, in the case of the SYN packet illustrated in FIG. 5, the mirroring switch registration table 40 records the transmission source IP address (SA) "10.1.1.1" into the transmission destination IP address 41, the transmission source port number (SP) "80" into the transmission destination port number 42, the transmission destination IP address (DA) "1.1.1.1" into the transmission source IP address 43, and the transmission destination port number (DP) "10000" in the transmission source port number 44.

After saving the information, the switch 10 copies only a packet corresponding to the connection information recorded in the connection table 70 and transmits to the analyzer device 2. The packet corresponding to the connection information recorded in the connection table 70 is a packet including the connection information on transmission source and transmission destination thereof that is logically identical with the connection information recorded in the connection table 70.

By deleting specific connection information from the connection table 70, a setting of not copying a packet corresponding to the deleted connection information is performed. For this reason, in response to reception of a copied packet, the analyzer device 2 instructs switches other than the switch 10 that has transmitted a packet for establishing a first connection to the analyzer device 2 based on the mirroring switch registration table 40 in which the connection information is recorded not to designate the packet as a mirroring target of the identical connection.

Figure 15:
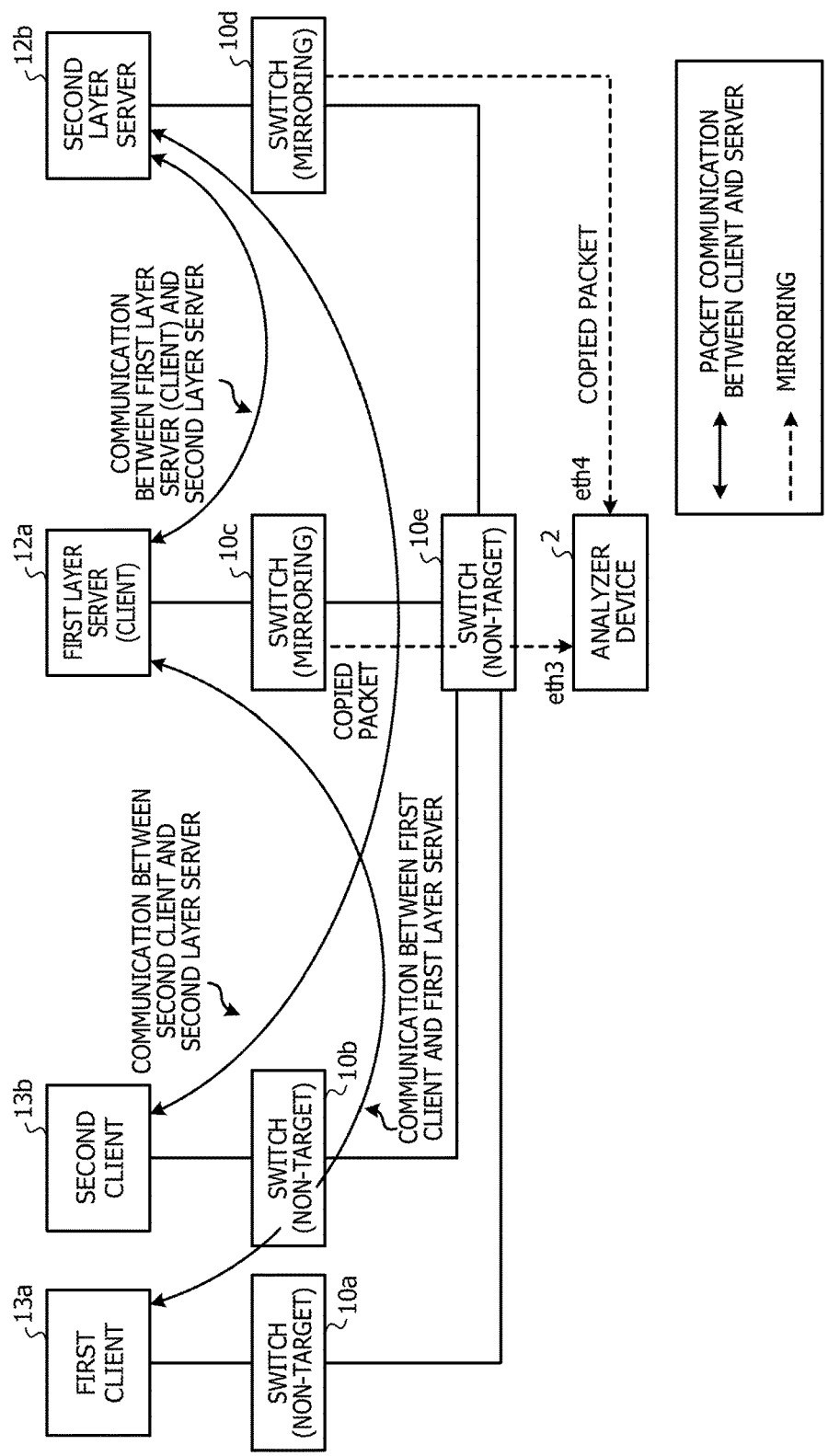
FIG. 15 illustrates an example of mirroring in a unit of connection according to an embodiment.

As an example, the function in the information processing system illustrated in FIG. 15 is described, for the convenience purpose, based on the target switches (switches including the function) of a switch 10c just close to the first layer server 12a and a switch 10d close to the second layer server 12b, and non-target switches (switches not including the function) of switches 10a, 10b, and switch 10e. At that time, the communication packet is mirrored by the switch 10c existing on the communication path between the first client 13a and the first layer server 12a, and a copied packet is sent to the analyzer device 2.

Next, the communication packet is mirrored by the switch 10d existing on the communication path between the second client 13b and the second layer server 12b, and a copied packet is sent to the analyzer device 2. Thereafter, when a packet passes through switches 10c, 10d existing on the communication path between the first layer server 12a and the second layer server 12b, the analyzer device 2 detects establishment of an identical connection by the other switch 10d but not the switch 10c which has first detected establishment of the connection. In that case, the packet is mirrored by the switch 10c to which the first layer server 12a is coupled, and mirroring is not performed by the switch 10d. As illustrated in steps S9 and S10 of FIG. 18 described below, the switch 10d identified by the switch ID of the SYN packet received later receives connection information deletion notification from the analyzer device 2. In response to this notification, the record unit 17 of the switch 10d deletes the corresponding connection information from the connection table 70d

Thus, the packet acquisition method according to the embodiment avoids identical packets from being transferred to the analyzer device 2 in duplicate by mirroring of multiple switches 10 and thereby reduces the traffic amount. When the analyzer device 2 enables only the mirroring function of a switch 10 which has first detected the connection establishment, a switch 10 closest to the client 13 performs mirroring of the packet, and the mirroring function of other switches 10 is stopped. Thus, the RTT is calculated correctly.

The analyzer device 2 analyzes the copied packet and detects a packet which establishes the connection (for example, SYN packet). Referring to the TCP/IP communication system as an example, when detected the SYN packet, the analyzer device 2 analyzes the switch ID which may be acquired through the input interface and which is the address of the received switch, and connection establishment information of the SYN packet. The switch ID and connection establishment information are saved into the mirroring switch registration table 40.

The analyzer device 2 searches the mirroring switch registration table 40. If connection information logically identical with the connection establishment information is already registered in the mirroring switch registration table 40, the analyzer device 2 determines that an identical connection of the mirroring target has been established by the other switch 10. Thus, the analyzer device 2 determines that the switch is a second or subsequent switch which has detected the SYN packet (hereinafter referred to as "other switch"). When determined that notification of the SYN packet is sent from the other switch, the analyzer device 2 transmits, to the other switch, the connection information deletion notification instructing to delete the connection information from the connection table 70 managed by the other switch. Thus, the connection information is deleted from the connection table 70 managed by the other switch, and the above problem of the duplicate transfer of same packets is solved by excluding from the mirroring target.

Figure 16:
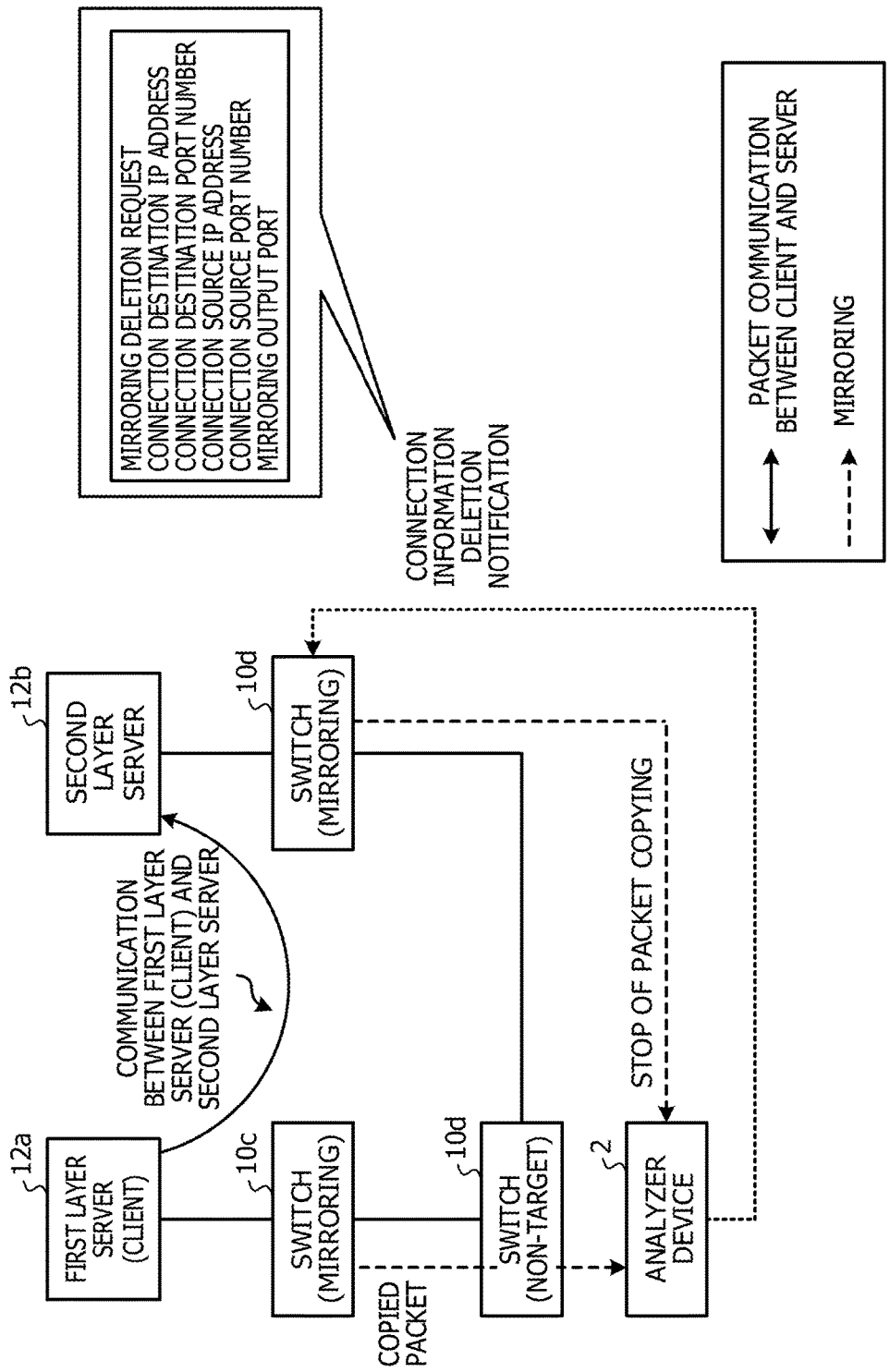
FIG. 16 illustrates an example of mirroring in a unit of connection according to an embodiment.

FIG. 16 illustrates an example of the connection information deletion notification being sent to the switch 10*d*. Thus, the connection information is deleted from the connection table 70 of the switch 10*d*. Thus, mirroring by the switch 10*d* for the connection indicated by the connection information is stopped. An example of information included in the connection information deletion notification includes the mirroring deletion request, transmission destination IP address, transmission destination port number, transmission source IP address, transmission source port number, and mirroring output port.

Figure 17:
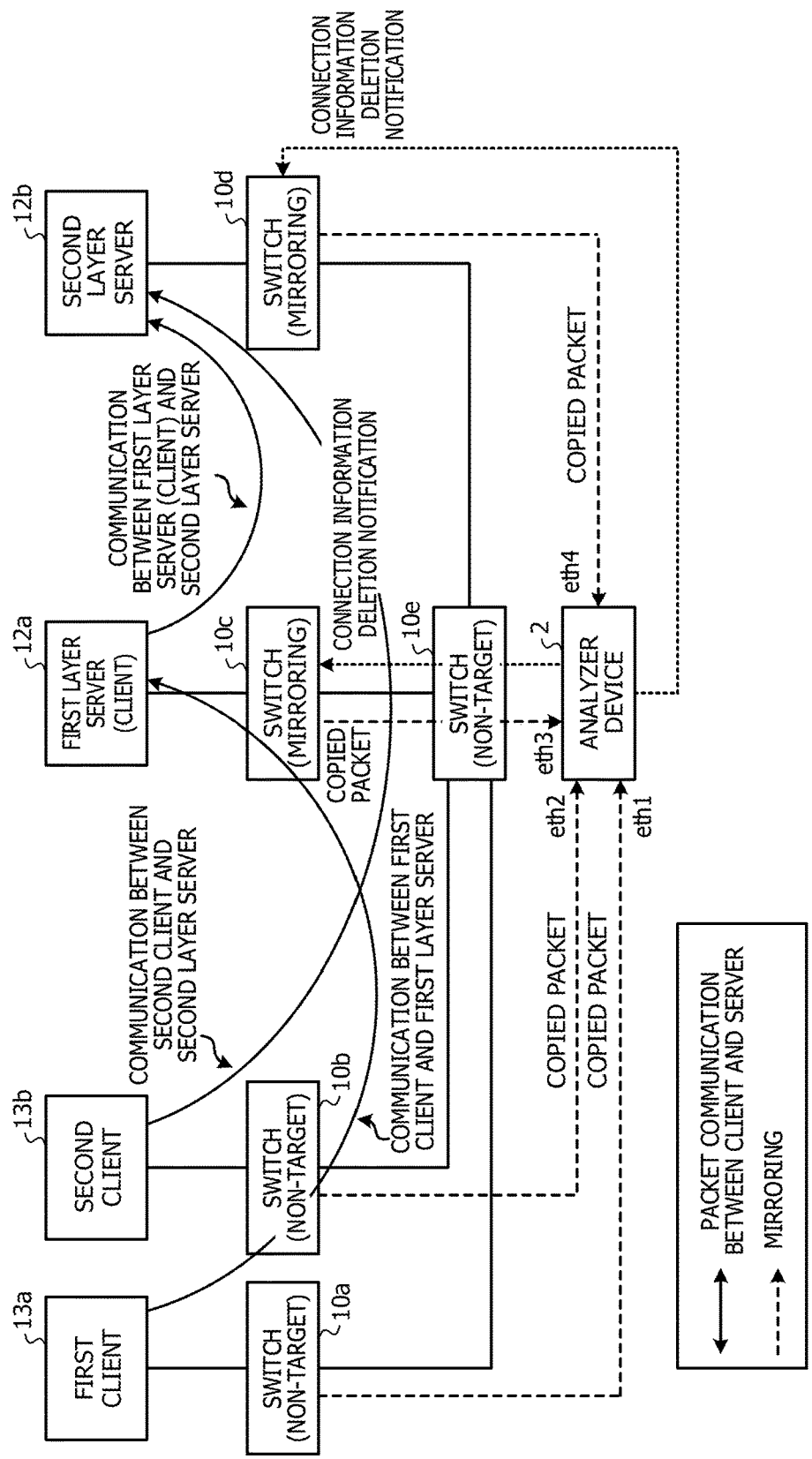
FIG. 17 illustrates an example of mirroring in a unit of connection according to an embodiment.

An example of the information processing system including multi-layered mirroring switches is described with reference to FIG. 17. In this case, communication between the first client 13*a* and the first layer server 12*a* occurs, and the copied SYN packet (hereinafter also referred to as "copied SYN packet") is transmitted from the switch 10*a* to the analyzer device 2. Next, the copied SYN packet is transmitted from the switch 10*c* to the analyzer device 2. The analyzer device 2 receives two copied SYN packets sequentially. When detected a second copied SYN packet, the analyzer device 2 identifies the address (switch ID) of the switch 10*c* based on the input interface (eth3) of the copied SYN packet. The analyzer device 2 transmits connection information deletion notification to the switch 10*c* of the switch ID for deleting connection information of the packet (connection destination IP address, connection destination port number, connection source IP address and connection source port number) from the connection table 70. When the corresponding connection information is deleted from the connection table 70 in accordance with the notification, mirroring by the switch 10*c* for the connection is stopped. Thus, duplicate transfer of copied identical packets to the analyzer device 2 is avoided.

Similarly, communication between the second client 13*a* and the second server 12*b* occurs. When a copied SYN packet is transmitted from the switch 10*b* to the analyzer device 2, duplicate transmission of copied identical packets from the switch 10*d* to the analyzer device 2 is avoided.

Similarly, communication between the first server 12*a* and the second server 12*b* occurs. When a copied SYN packet is transmitted from the switch 10*c* to the analyzer device 2, duplicate transmission of copied packets from the switch 10*d* to the analyzer device 2 is avoided.

Next, packet mirroring (packet acquisition method) between the analyzer device 2 and multiple switches 10 described above and RTT calculation method according to the first to third embodiments are described in order.

First Embodiment

Mirroring of Packet

Figure 18:
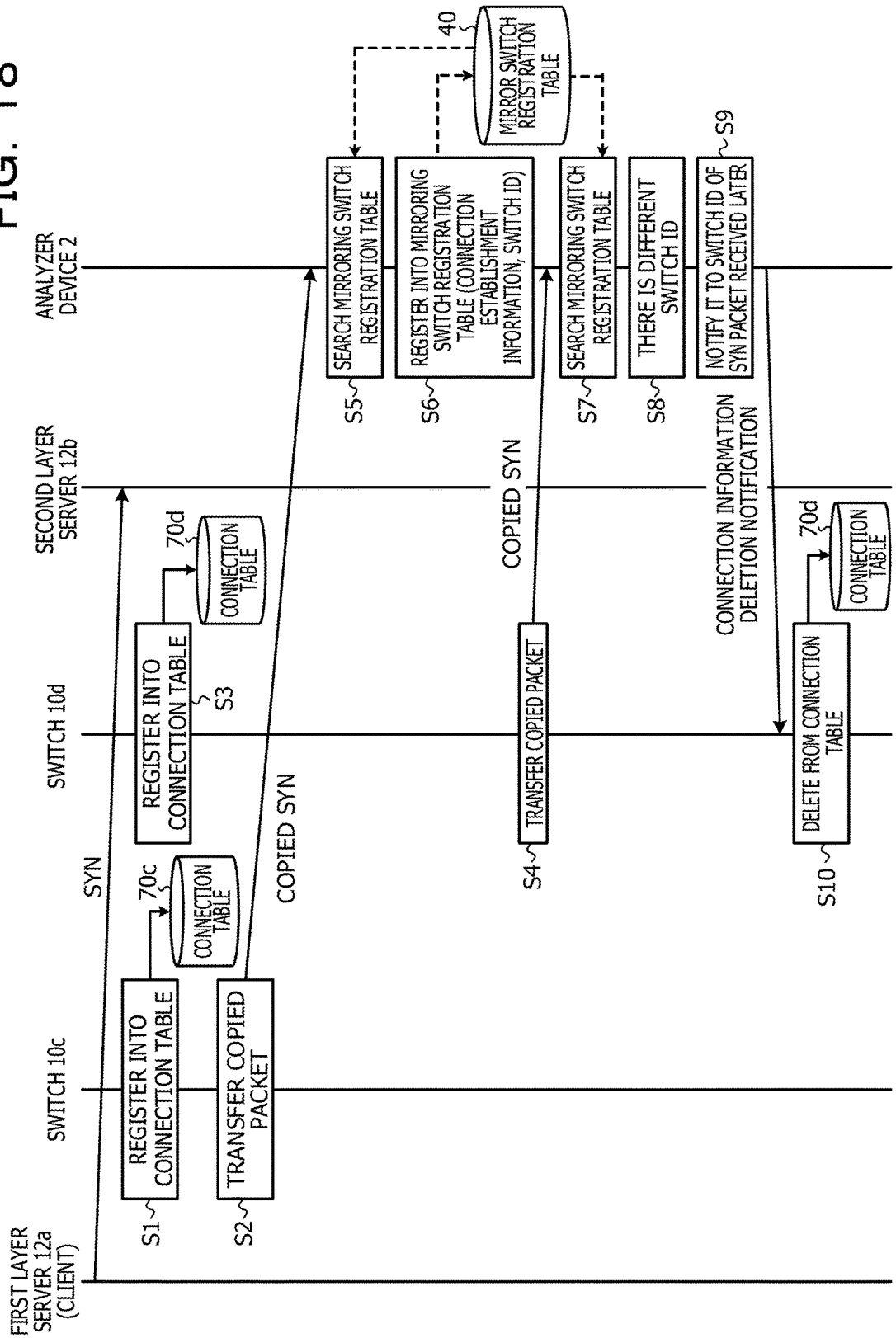
FIG. 18 is a time chart illustrating an example of mirroring of a packet according to an embodiment.
Figure 19:
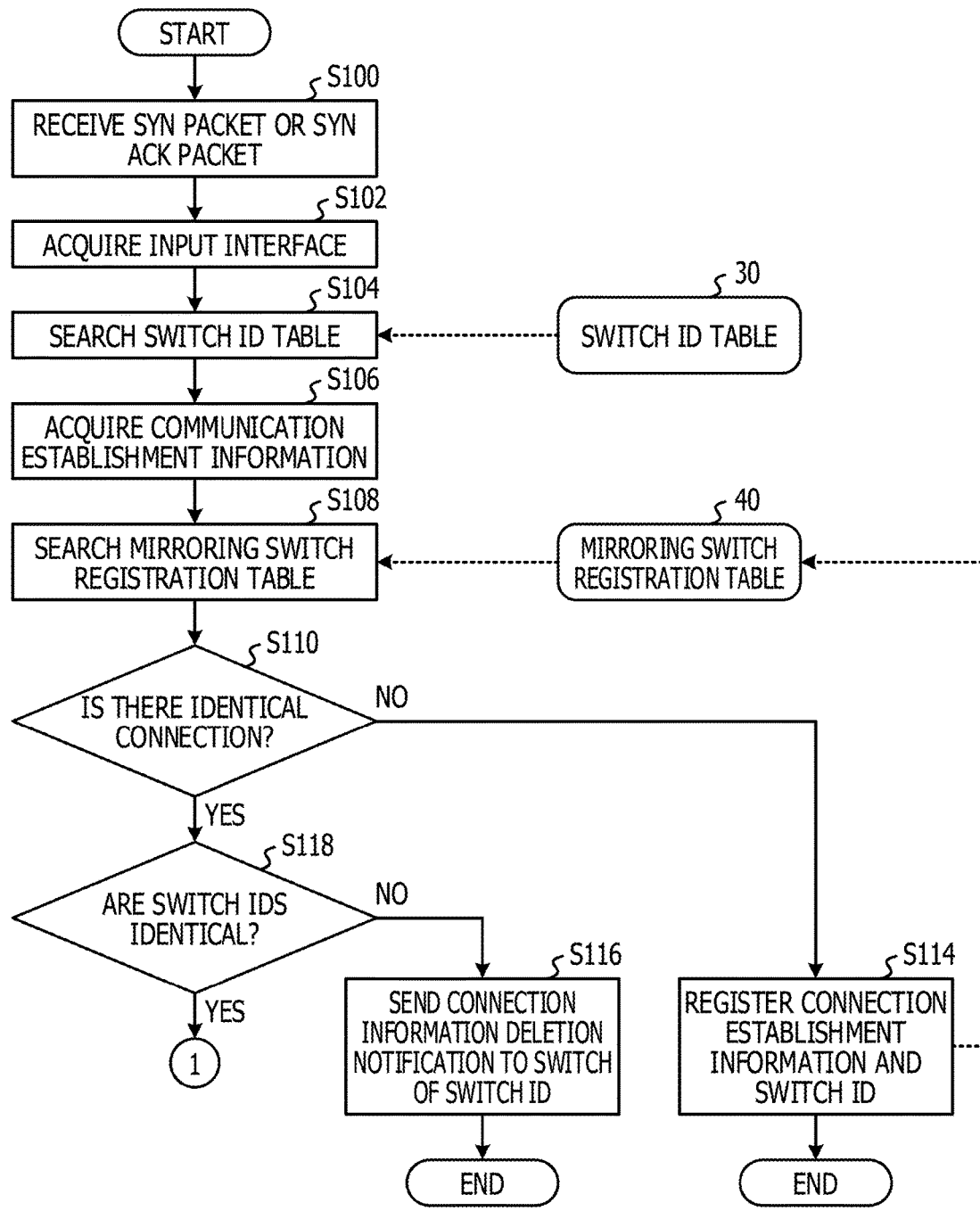
FIG. 19 is a flowchart illustrating an example of a packet processing performed by an analyzer device according to a first embodiment.
Figure 20:
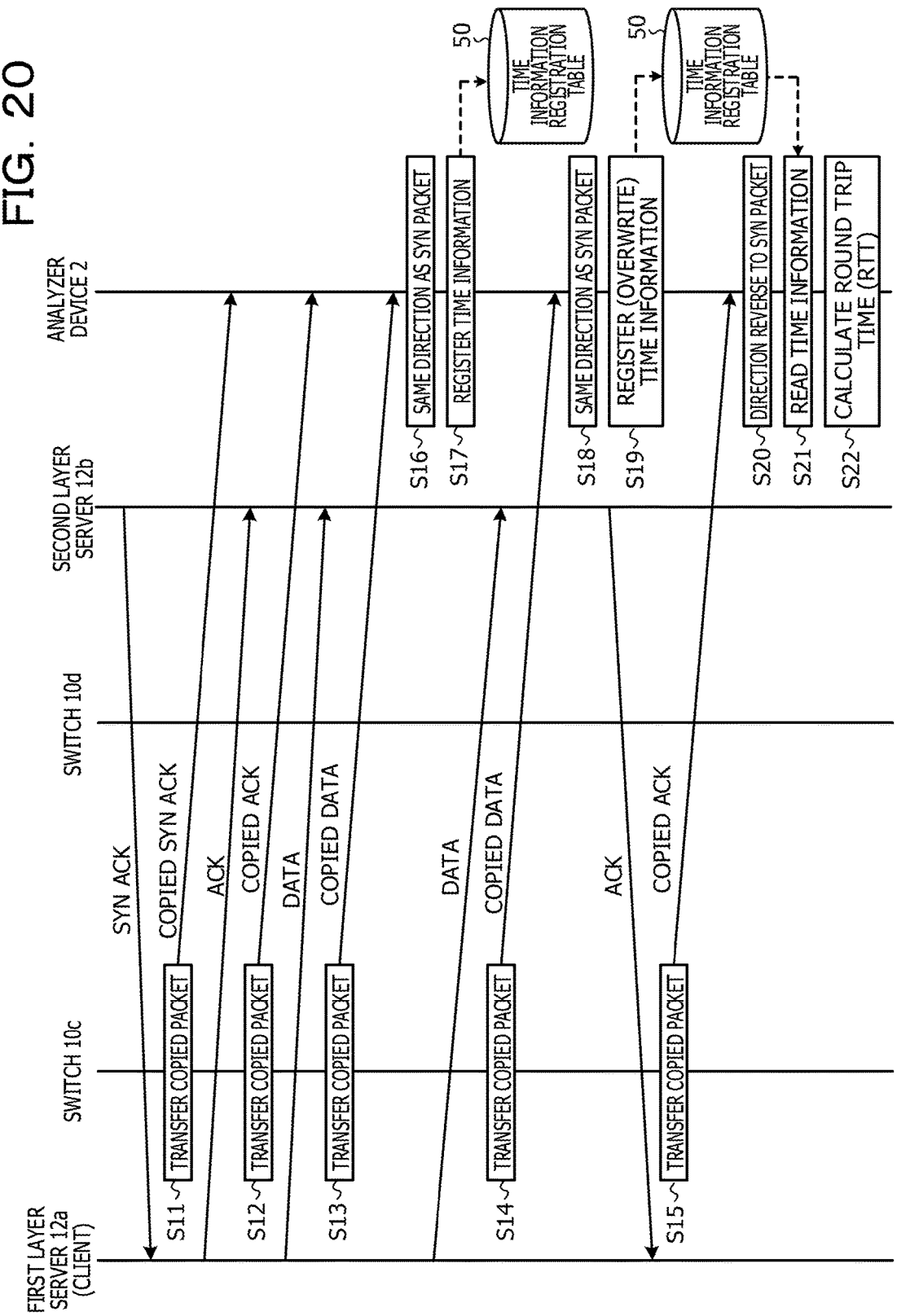
FIG. 20 is a time chart illustrating an example of mirroring of a packet according to the first embodiment.
Figure 21:
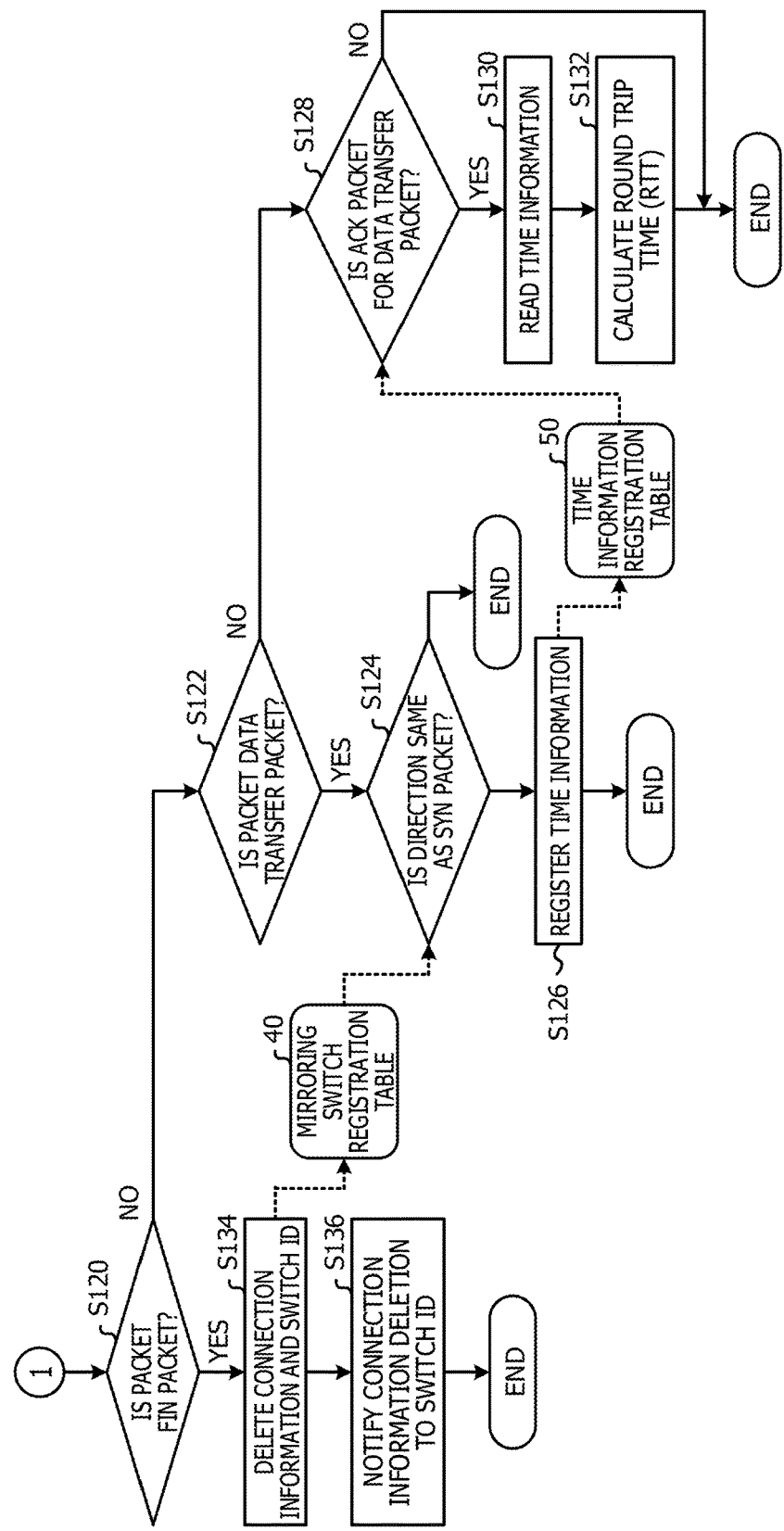
FIG. 21 is a flowchart illustrating an example of a RTT calculation processing performed by the analyzer device according to the first embodiment.
Figure 22:
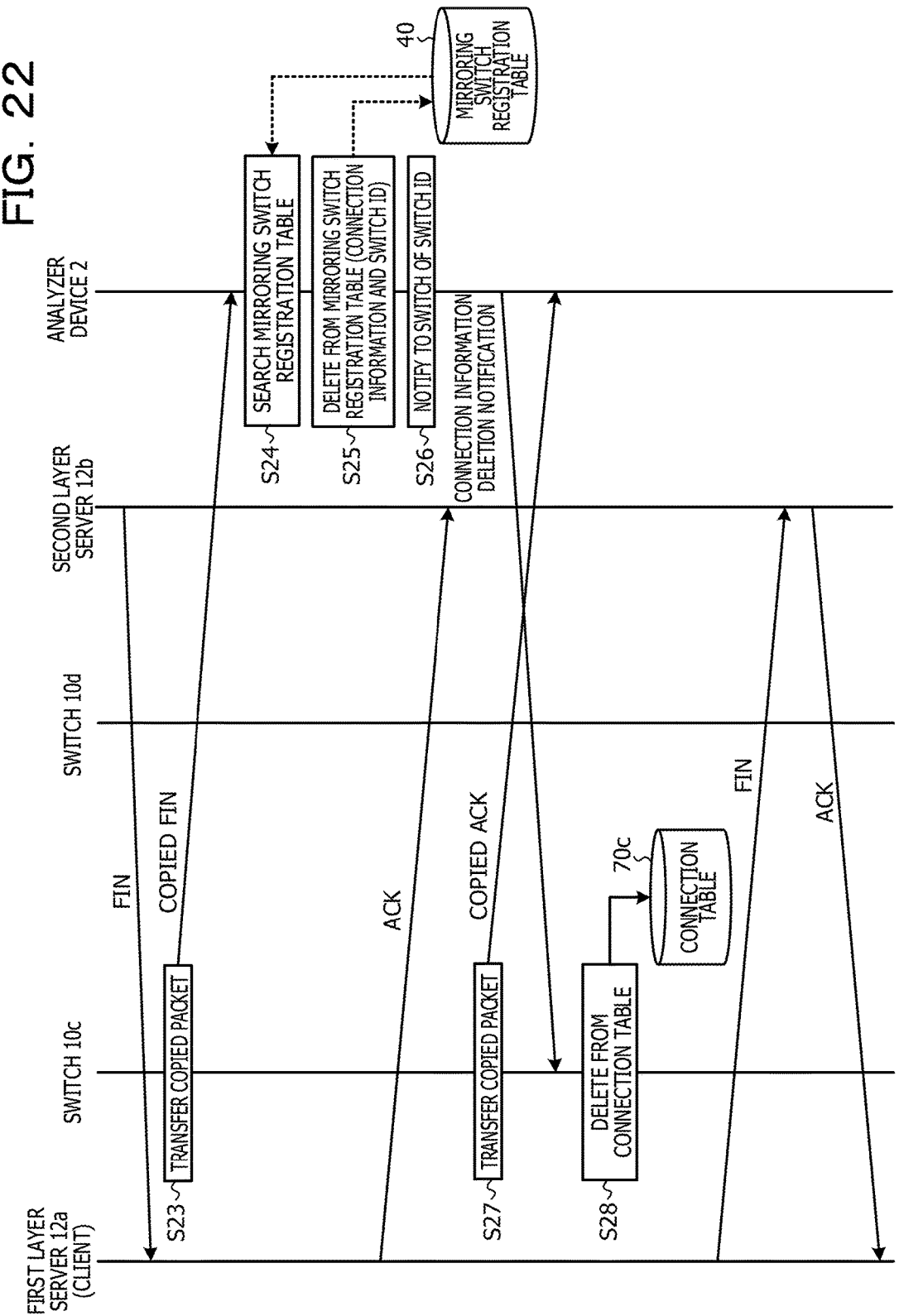
FIG. 22 is a time chart illustrating an example of mirroring of the packet according to the first embodiment.

A packet mirroring processing in the information processing system 1 according to the first embodiment is described with reference to FIGS. 18 to 22. FIGS. 18, 20, and 22 illustrate an example of the mirroring operation from the connection establishment to the disconnection of TCP/IP. FIGS. 19 and 21 illustrate an example of the operation of the analyzer device in the mirroring operation.

According to the embodiment, in a packet communication between the first layer server 12*a* and the second layer server 12*b*, mirroring of the packet to the analyzer device 2 is performed by a switch 10*c* closer to the first layer server 12*a* and a switch 10*d* closer to the second layer server 12*b*.

First, an SYN packet is transmitted from the first layer server 12*a* to the second layer server 12*b*. The reception unit 14 of the switch 10*c* receives the packet. The record unit 17 of the switch 10*c* registers the transmission destination IP address, transmission destination port number, transmission source IP address, and transmission source port number of the SYN packet into the connection table 70*c* of the switch 10*c* thereof (step S1). For example, as illustrated in FIG. 6D, "10.1.1.1", "80", "1.1.1.1", and "10000" are registered into the transmission destination IP address 71, transmission destination port number 72, transmission source IP address 73 and transmission source port number 74 respectively. Next, the transmission unit 16 of the switch 10*c* transfers the copied SYN packet to the analyzer device 2 (step S2).

Similarly, the record unit 17 of the switch 10*d* registers the transmission destination IP address, transmission destination port number, transmission source IP address, and transmission source port number of the SYN packet into the connection table 70*d* of the switch 10*d* thereof (step S3). Next, the transmission unit 16 of the switch 10*d* transfers the copied SYN packet to the analyzer device 2 (step S4).

The reception unit 21 of the analyzer device 2 receives the copied SYN packet. The determination unit 23 searches the mirroring switch registration table 40 (FIG. 7) (step S5) and determines whether connection information identical with connection establishment information included in the copied SYN packet is already registered in the mirroring switch registration table 40. When the determination unit 23 determines that connection information identical with the connection establishment information is not registered, the record unit 25 registers the connection establishment information into the mirroring switch registration table 40 (step S6). Thus, connection information of the transmission destination IP address 41, transmission destination port number 42, transmission source IP address 43, and transmission source port number 44 is registered into the mirroring switch registration table 40. The record unit 25 identifies the switch ID 32 with reference to the switch ID table 30 (FIG. 8) based on the interface 31 through which the copied SYN packet is inputted, and registers the identified switch ID 32 into the switch ID 45 of the mirroring switch registration table 40 (step S6).

When the reception unit 21 receives the copied SYN packet from the switch 10*d*, the determination unit 23 searches the mirroring switch registration table 40 (step S7) and determines whether connection information identical with the connection establishment information included in the copied SYN packet is already registered. Here, connection information, which is identical with the connection establishment information of the copied SYN packet and includes a switch ID of the switch 10c different from a switch ID corresponding to the switch 10d, is already registered. Then, the determination unit 23 determines that connection information of a different switch ID is registered (step S8). The notification unit 26 transmits the connection information deletion notification to the switch 10d identified by a switch ID of the SYN packet received later (step S9). Upon receiving the connection information deletion notification, the record unit 17 of the switch 10d deletes the corresponding connection information from the connection table 70d (step S10).

(Registration into Mirroring Switch Registration Table 40)

Among operations illustrated in FIG. 18, a processing performed by the analyzer device 2 is described with reference to FIG. 19. When the processing is started, the reception unit 21 of the analyzer device receives the SYN packet or SYN ACK packet (step S100). The SYN packet or SYN ACK packet received by the reception unit 21 of the analyzer device is a packet copied through mirroring by any one of switches as described above. For example, the reception unit 21 receives the SYN packet. However, when a failure occurs such as a case where a packet sent out from the switch 10 is lost before reaching the analyzer device 2 and therefore does not reach the analyzer device 2, the analyzer device 2 receives an SYN ACK packet.

The connection management unit 22 acquires information indicating the interface 31 through which the received packet is inputted (step S102). Next, the determination unit 23 searches the switch ID table 30 and acquires the switch ID 32 based on the interface 31 through which the received packet is inputted (step S104). Next, the determination unit 23 acquires the connection establishment information (transmission destination IP address, transmission destination port number, transmission source IP address and transmission source port number) from the packet (step S106).

The determination unit 23 searches the mirroring switch registration table 40 (step S108). When the determination unit 23 determines that connection information identical with the acquired connection establishment information is not registered in the mirroring switch registration table 40 (step S110), the record unit 25 registers the connection establishment information and the switch ID into the mirroring switch registration table 40 (step S114).

Meanwhile, if the determination unit 23 determines in the step S110 that identical connection information is recorded in the mirroring switch registration table 40 and switch IDs are different from each other (step S118), the notification unit 26 sends connection information deletion notification to the switch 10 of transmission source of the SYN packet received later (step S116).

[Calculation of RTT]

Next, RTT calculation processing in the information processing system 1 according to the first embodiment is described with reference to FIG. 20. When an SYN ACK packet is transmitted from the second layer server 12b to the first layer server 12a, the reception unit 14 of the switch 10c receives the SYN ACK packet. When the control unit 15 determines that the packet is a packet including information on the transmission source and transmission destination identical with the connection information recorded in the connection table 70c, the transmission unit 16 transfers a copied SYN ACK packet (hereinafter also referred to as "copied SYN ACK packet") to the analyzer device 2 (step S11).

In contrast, mirroring of the SYN ACK packet is not performed by the switch 10d since the received SYN ACK packet is not a packet including information on the transmission source and transmission destination identical with the connection information recorded in the connection table 70d.

Next, when an ACK packet is transmitted from the first layer server 12a to the second layer server 12b, the reception unit 14 of the switch 10c receives the ACK packet, and the transmission unit 16 of the switch 10c transfers a copied ACK packet to the analyzer device 2 (step S12).

Next, a data transfer packet is transmitted from the first layer server 12a to the second layer server 12b. The reception unit 14 of the switch 10c receives the data transfer packet, and the transmission unit 16 of the switch 10c transfers a copied data transfer packet (hereinafter also referred to as "data transfer packet") to the analyzer device 2 (step S13).

The reception unit 21 of the analyzer device 2 receives the copied data transfer packet transmitted from the switch 10c. At that time, the determination unit 23 determines based on the information on the transmission source and transmission destination included in the copied data transfer packet whether the direction of the transmission source and the transmission destination of the received copied data transfer packet is the same as the SYN packet (step S16). Here, direction of the transmission source and transmission destination of the copied data transfer packet is the same as the SYN packet. Therefore, the record unit 25 registers a time point when the copied data transfer packet is received into time information 56 of the time information registration table 50 illustrated in FIG. 9 (step S17).

Next, the reception unit 21 of the analyzer device 2 receives the copied data transfer packet (step S14) transmitted from the switch 10c. The determination unit 23 determines based on the information on the transmission source and transmission destination included in the copied data transfer packet whether the direction of the transmission source and the transmission destination of the received copied data transfer packet is the same as the SYN packet (step S18). Here, direction of the transmission source and transmission destination of the copied data transfer packet is the same as the SYN packet. Therefore, the record unit 25 overwrites the time point when the copied data transfer packet is received into time information 56 of the time information registration table 50 illustrated in FIG. 9 (step S19).

Next, the reception unit 21 of the analyzer device 2 receives the copied ACK packet (step S15) transmitted from the switch 10c. The determination unit 23 determines based on the information on the transmission source and transmission destination included in the copied ACK packet that the direction of the transmission source and the transmission destination of the received copied ACK packet is reverse to the direction of the SYN packet having connection information identical with the ACK packet (step S20). In this case, the calculation unit 24 reads time information 56 of the corresponding connection information from the time information registration table 50 (step S21) and calculates the RTT from a difference between a time point when the copied ACK packet is received and the read time information 56 (step S22).

(RTT Calculation Function)

Among operations illustrated in FIG. 20, a processing performed by the analyzer device 2 is described with reference to a flowchart of FIG. 21. When the processing following a terminal "1" of FIG. 19 is started, the determination unit 23 of the analyzer device 2 determines whether the received copied packet is a FIN packet (step S120).

When determined that the copied packet is not the FIN packet, the determination unit 23 determines whether the copied packet is a data transfer packet (step S122). When determined that the copied packet is the data transfer packet, the determination unit 23 determines whether direction of the copied packet is the same as the SYN packet (step S124). When determined that direction of the copied packet is not the same as the SYN packet, the processing ends. Meanwhile, when determined that direction of the copied packet is the same as the SYN packet, the record unit 25 registers a time point when the copied packet is received into the time information 56 of the time information registration table 50 (step S126), and the processing ends.

In the step S122, when determined that the copied packet is not the data transfer packet, the determination unit 23 determines whether the copied packet is an ACK packet for the data transfer packet (step S128). When determined that the copied packet is not the ACK packet for the data transfer packet, the analyzer device 2 ends the processing. When determined that the copied packet is the ACK packet for the data transfer packet, the calculation unit 24 reads out time information 56 of the corresponding connection information from the time information registration table 50 (step S130). The calculation unit 24 calculates the RTT from a difference between the time point when the copied packet is received and the read time information 56 (step S132), and the processing ends. A processing following the determination in the step S120 that the copied packet is the FIN packet is described later.

[Disconnection of Connection]

Next, a processing of disconnecting the connection in the information processing system 1 according to the first embodiment is described with reference to FIG. 22. The FIN packet (that is, a packet that disconnects the connection) is transmitted from the second layer server 12*b* to the first layer server 12*a*. The reception unit 14 of the switch 10*c* receives a FIN packet. The transmission unit 16 of the switch 10*c* transfers a copied FIN packet (hereinafter also referred to as "copied FIN packet") to the analyzer device 2 (step S23).

When the reception unit 21 of the analyzer device 2 receives a copied FIN packet, the determination unit 23 searches the mirroring switch registration table 40 (step S24). The determination unit 23 detects connection information logically identical with information on the transmission source and transmission destination included in the FIN packet, and the record unit 25 deletes the connection information and switch ID from the mirroring switch registration table 40 (step S25). Thus, the transmission destination IP address 41, transmission destination port number 42, transmission source IP address 43, transmission source port number 44, and switch ID 45 of the connection information are deleted from the mirroring switch registration table 40.

The notification unit 26 transmits the connection information deletion notification to the switch 10*c* identified by the deleted switch ID 45 (step S26). Before the connection information deletion notification reaches, the switch 10*c* transfers a copied ACK packet for the received FIN packet (step S27). Upon receiving the connection information deletion notification, the record unit 17 of the switch 10*c* deletes connection information designated by the connection information deletion notification from the connection table 70*c* (step S28). Thus, mirroring by the switch 10 for the connection corresponding to the connection information designated by the connection information deletion notification is ended.

Referring back to FIG. 21, a processing of the analyzer device 2 performed when connection is disconnected is described. When the reception unit 21 of the analyzer device 2 receives a copied FIN packet, the determination unit 23 determines in the step S120 that the packet is a FIN packet. In this case, the record unit 25 deletes connection information logically identical with information on the transmission source and transmission destination included in the copied FIN packet, and the switch ID from the mirroring switch registration table 40 (step S134). Next, the notification unit 26 transmits the connection information deletion notification to the switch 10*c* identified by the deleted switch ID 45 (step S136), and the processing ends.

As described above, when multiple switches exist, the information processing system 1 according to the first embodiment selects a switch performing the mirroring so as to avoid duplication of the copied packet. That is, mirroring of the same packet is avoided by a switch other than a switch which has first performed mirroring of the packet for establishing a connection to the analyzer device 2. Thus, duplicate transfer of identical packets to the analyzer device 2 is avoided. Mirroring of the packet is performed only by the switch 10 that has first performed mirroring of the packet for establishing a connection to the analyzer device 2. Thus, in the data transmission from the client 13 to the server 12, the RTT is precisely calculated based on a copied packet transferred from a switch closest to the client 13. When data is transmitted from the server 12 to the client 13, the RTT is precisely calculated based on a copied packet transferred from a switch closest to the server 12.

Second Embodiment

In the first embodiment, a packet acquisition method in the TCP/IP connection establishment procedure (three-way handshake) is described as above. However, the packet acquisition procedure according to the embodiment may be applied not only to the TCP/IP connection establishment but also to the connection establishment procedure of other data communication systems (for example, high-level data link control (HDLC) communication.

[Mirroring of Packet]

Figure 23:
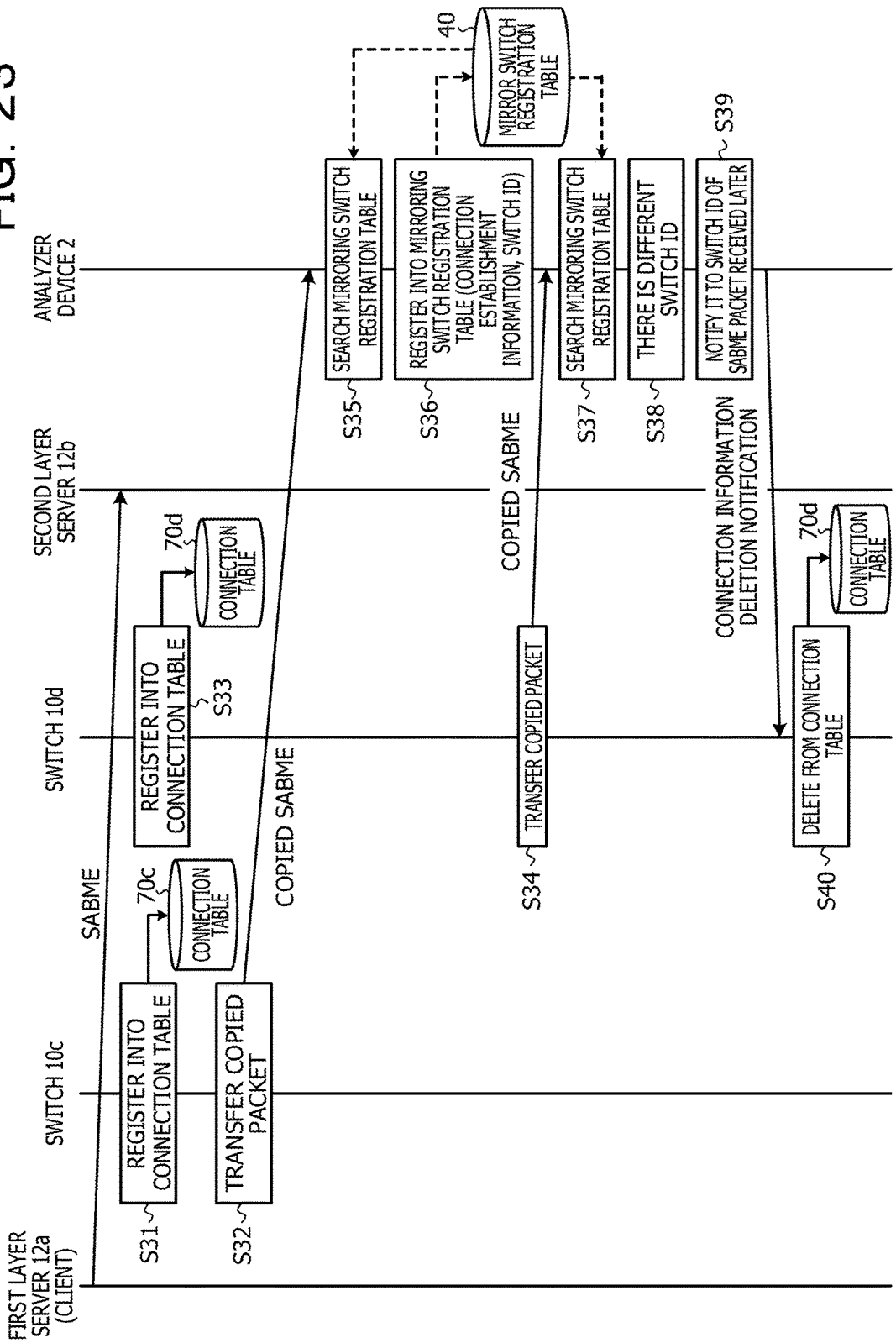
FIG. 23 is a time chart illustrating an example of mirroring of a packet according to a second embodiment.
Figure 24:
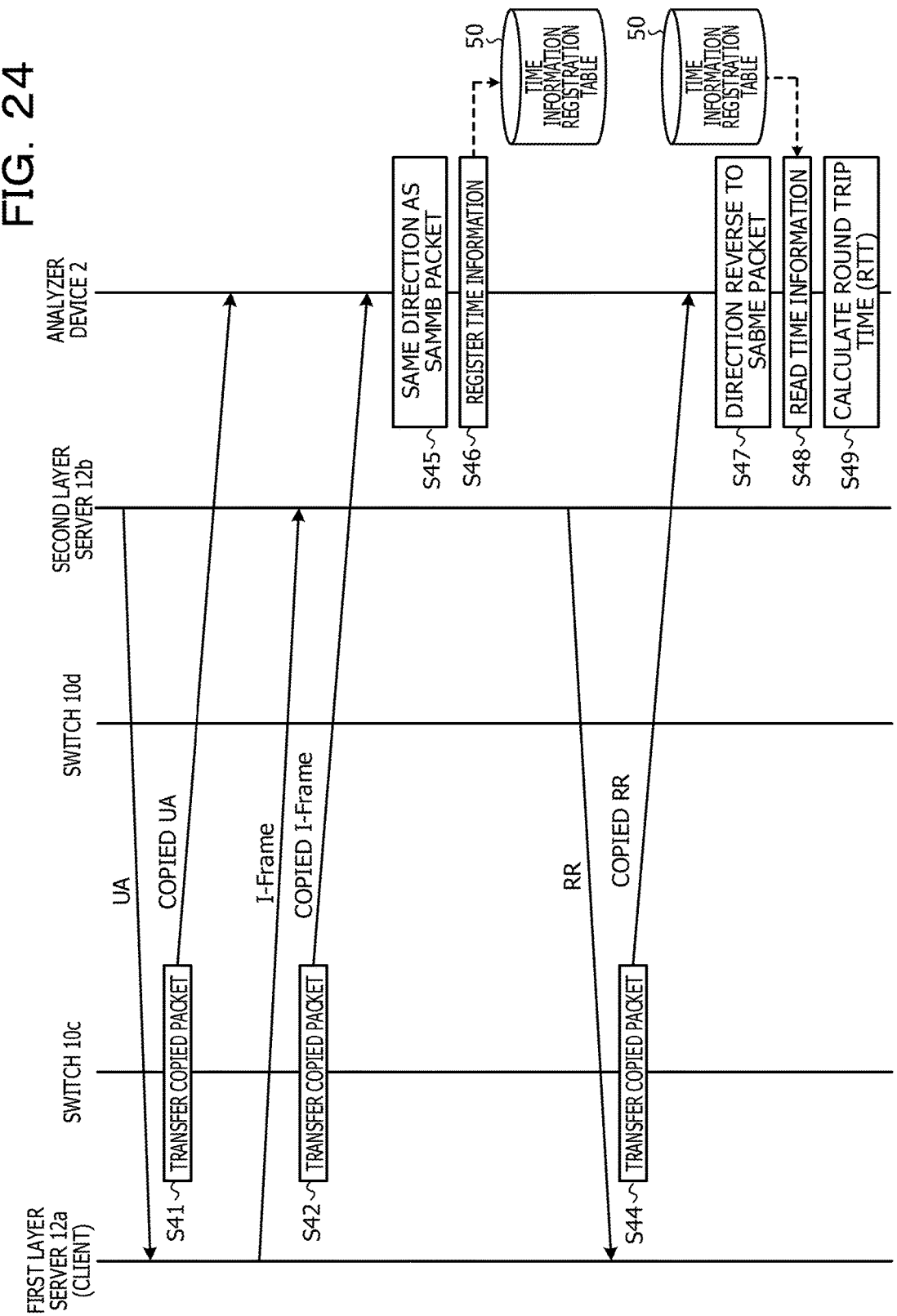
FIG. 24 is a time chart illustrating an example of mirroring of the packet according to the second embodiment.
Figure 25:
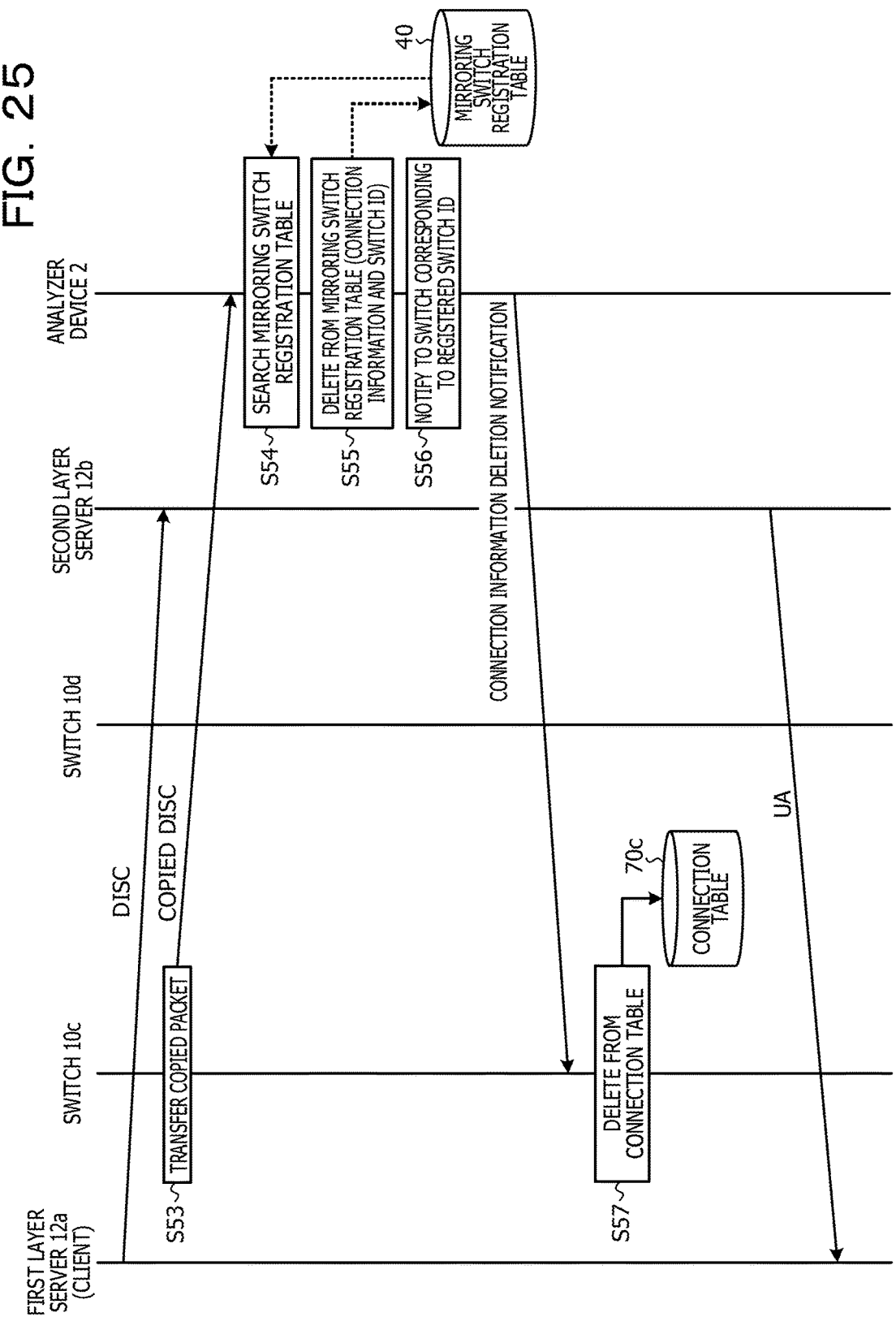
FIG. 25 is a flowchart illustrating an example of a packet processing performed by an analyzer device according to the second embodiment.

A mirroring of the packet in an information processing system 1 according to the second embodiment is described with reference to FIGS. 23 to 25. FIGS. 23 to 25 illustrate an example of the mirroring operation from connection establishment to disconnection of the set asynchronous balanced mode (SABME) which is one of operation mode set commands in the HDLC.

First, a SABME packet is transmitted from the first layer server 12*a* to the second layer server 12*b*. The reception unit 14 of the switch 10*c* receives the SABME packet. The record unit 17 registers the transmission destination IP address, transmission destination port number, transmission source IP address, and transmission source port number of the SABME packet into the connection table 70*c* of the switch 10*c* thereof (step S31). Next, the transmission unit 16 of the switch 10*c* transfers a copied SABME packet (hereinafter also referred to as "copied SABME packet") to the analyzer device 2 (step S32).

Similarly, the record unit 17 of the switch 10*d* registers the transmission destination IP address, transmission destination port number, transmission source IP address, and transmission source port number of the SABME packet into the connection table 70*d* of the switch thereof (step S33). Next, the transmission unit 16 of the switch 10*d* transfers the copied SABME packet to the analyzer device 2 (step S34).

When the reception unit 21 of the analyzer device 2 receives a copied SABME packet, the determination unit 23 searches the mirroring switch registration table 40 (step S35) and determines whether connection information identical with connection establishment information of the SABME packet is already registered in the mirroring switch registration table 40. When the determination unit 23 determines that connection information identical with the connection establishment information of the SABME packet is not registered in the mirroring switch registration table 40, the record unit 25 registers the connection establishment information into the mirroring switch registration table 40 (step S36). Thus, connection information of the transmission destination IP address 41, transmission destination port number 42, transmission source IP address 43, and transmission source port number 44 is registered into the mirroring switch registration table 40. The record unit 25 identifies the switch ID 32 with reference to the switch ID table 30 based on the interface 31 through which the copied SABME packet is inputted, and registers the identified switch ID 32 into the switch ID 45 of the mirroring switch registration table 40 (step S36).

When the reception unit 21 receives a copied SABME packet from the switch 10d, the determination unit 23 searches the mirroring switch registration table 40 (step S37) and determines whether connection information identical with the connection establishment information included in the SABME packet is registered in the mirroring switch registration table 40. Here, connection information, which is identical with the connection establishment information and includes a switch ID not corresponding to the switch 10d is registered. Then, the determination unit 23 determines that connection information of a different switch ID is already registered in the mirroring switch registration table 40 (step S38). The notification unit 26 transmits the connection information deletion notification to the switch 10d identified by a switch ID of the SYN packet received later (step S39). Upon receiving the connection information deletion notification, the record unit 17 of the switch 10d deletes connection information designated by the connection information deletion notification from the connection table 70d (step S40).

[Calculation of RTT]

Then, in the information processing system 1 according to the second embodiment, an unnumbered acknowledgement (UA) packet is transmitted from the second layer server 12b to the first layer server 12a as illustrated in FIG. 24. The reception unit 14 of the switch 10c receives a UA packet. When the control unit 15 of the switch 10c determines that the packet is a packet including information on the transmission source and transmission destination corresponding to the connection information recorded in the connection table 70c, the transmission unit 16 transmits a copied UA packet (hereinafter also referred to as "copied UA packet") to the analyzer device 2 (step S41).

In contrast, mirroring of the UA packet is not performed by the switch 10d since the UA packet is not a packet including information on the transmission source and transmission destination corresponding to the connection information recorded in the connection table 70d.

Next, an information frame (I-Frame) packet is transmitted from the first layer server 12a to the second layer server 12b. The reception unit 14 of the switch 10c receives the I-Frame packet, and the transmission unit 16 of the switch 10c transfers a copied I-Frame packet (hereinafter may be referred to as "copied I-Frame packet") to the analyzer device 2 (step S42).

The reception unit 21 of the analyzer device 2 receives the copied I-Frame packet transmitted from the switch 10c. The determination unit 23 determines based on the connection establishment information included in the copied I-Frame packet that the direction from the transmission source to the transmission destination of the received copied I-Frame packet is the same as the SABME packet (step S45). The record unit 25 registers information of the reception time 56 of the received copied I-Frame packet into the time information registration table 50 (step S46).

Next, a receive ready (RR) packet is transmitted from the second layer server 12b to the first layer server 12a. The reception unit 14 of the switch 10c receives the RR packet, and the transmission unit 16 of the switch 10c transfers a copied RR packet (hereinafter also referred to as "copied RR packet") to the analyzer device 2 (step S44).

The reception unit 21 of the analyzer device 2 receives the copied RR packet transmitted from the switch 10c. The determination unit 23 determines based on the connection information included in the copied RR packet that the direction of the transmission source and the transmission destination of the received copied RR packet is reverse to the direction of the SABME packet corresponding to the connection information of the received copied RR packet (step S47). The calculation unit 24 reads time information 56 of the corresponding connection information from the time information registration table 50 (step S48) and calculates the RTT from a difference between reception time information of the copied I-Frame packet and reception time information of the copied RR packet (step S49).

[Disconnection of Connection]

When connection is disconnected, a disconnect (DISC) packet is transmitted from the first layer server 12a to the second layer server 12b as illustrated inn FIG. 25. The reception unit 14 of the switch 10c receives a DISC packet. The transmission unit 16 of the switch 10c transfers a copied DISC packet (hereinafter also referred to as "copied DISC packet") to the analyzer device 2 (step S53).

When the reception unit 21 of the analyzer device 2 receives a copied DISC packet, the determination unit 23 searches the mirroring switch registration table 40 (step S54). When the determination unit 23 detects information identical with the connection information included in the copied DISC packet from the mirroring switch registration table 40, the record unit 25 deletes connection information and switch ID identical with the connection information included in the copied DISC packet from the mirroring switch registration table 40 (step S55). Thus, the transmission destination IP address 41, transmission destination port number 42, transmission source IP address 43, transmission source port number 44, and switch ID 45 of the corresponding connection information are deleted from the mirroring switch registration table 40.

The notification unit 26 transmits the connection information deletion notification to the switch 10c identified by the deleted switch ID 45 (step S56). Upon receiving the connection information deletion notification, the record unit 17 of the switch 10c deletes connection information designated by the connection information deletion notification from the connection table 70c (step S57). Thus, mirroring by the switch 10 for the connection corresponding to the connection information designated by the connection information deletion notification is ended.

As described above, when multiple switches exist, the information processing system 1 according to the second embodiment selects a switch performing the mirroring so as to avoid duplication of the copied packet. That is, mirroring of the same packet is avoided by a switch other than a switch which has first performed mirroring of the packet for establishing a connection to the analyzer device 2. Thus, duplicate transfer of the same packet to the analyzer device 2 is avoided. Mirroring of the packet is performed by a switch 10 that has first performed mirroring of the packet for establishing a connection to the analyzer device 2. Thus, in the data transmission from the client 13 to the server 12, the RTT is precisely calculated based on a copied packet transferred from a switch closest to the client 13. When data is transmitted from the server 12 to the client 13, the RTT is precisely calculated based on a copied packet transferred from a switch closest to the server 12.

Third Embodiment

Mirroring of Packet

Next, a mirroring of the packet in an information processing system 1 according to the third embodiment is described with reference to FIGS. 26 to 32. The information processing system 1 according to the third embodiment is capable of measuring a temporary RTT in the connection establishment procedure (for example, such as three handshake of TCP and HDLC communication).

Figure 26:
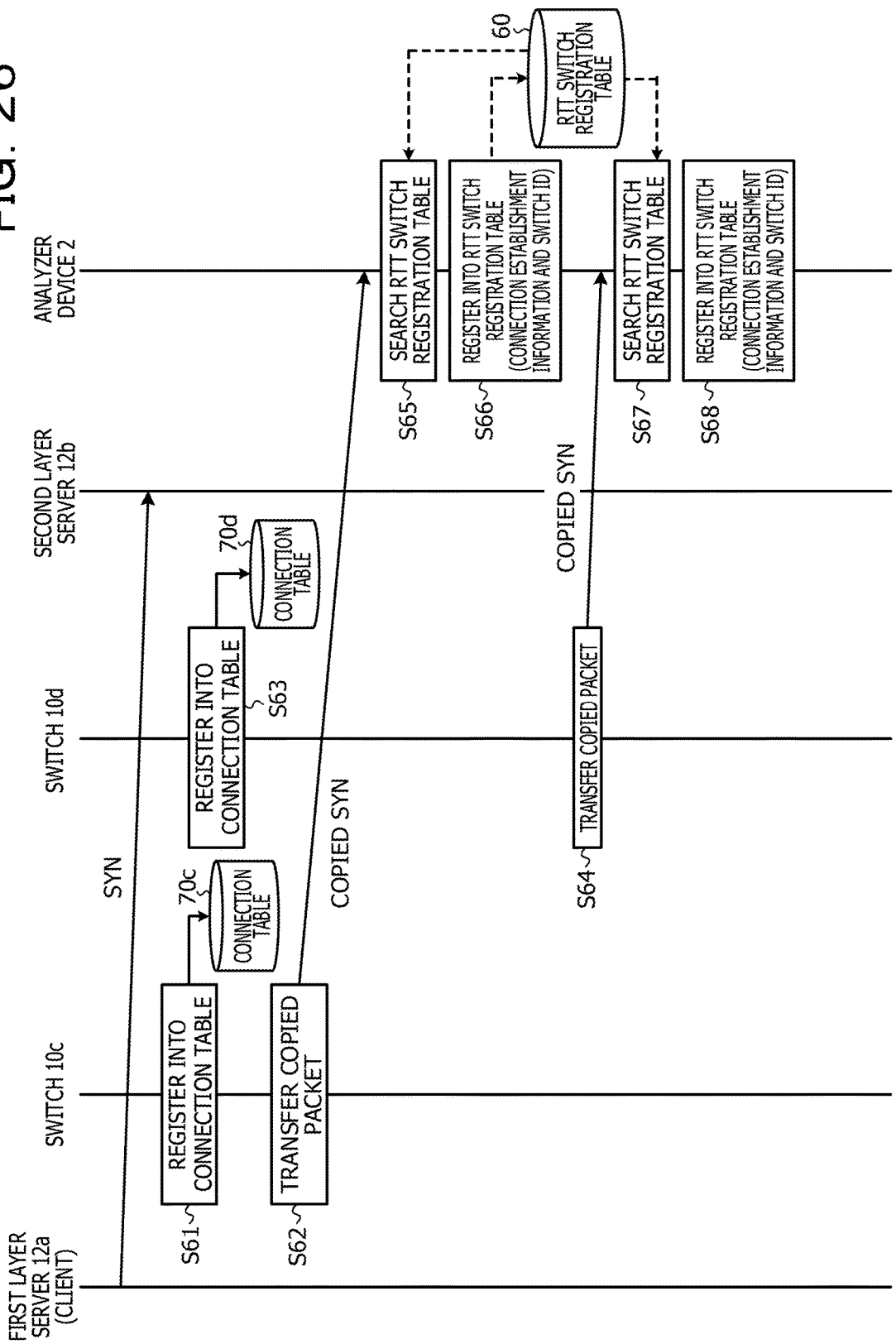
FIG. 26 is a time chart illustrating an example of mirroring of a packet according to a third embodiment.

For example, first, an SYN packet is transmitted from the first layer server 12a to the second layer server 12b as illustrated inn FIG. 26. Switches 10c, 10d receive the SYN packet, and the record unit 17 of each of the switches records the transmission destination IP address, the transmission destination port number, transmission source IP address, and transmission source port number of the SYN packet into the connection tables 70c, 70d thereof (steps S61, S63). Next, the transmission unit 16 of each of the switches 10c, 10d transfers a copied SYN packet to the analyzer device 2 (steps S62, S64).

When the reception unit 21 of the analyzer device 2 receives the copied SYN packet, the determination unit 23 searches the RTT switch registration table 60 (step S65) and determines whether information identical with the connection establishment information included in the copied SYN packet is registered in the RTT switch registration table 60. When the determination unit 23 determines that information identical with the connection establishment information included in the copied SYN packet is not registered in the RTT switch registration table 60, the record unit 25 registers the connection establishment information into the RTT switch registration table 60 (step S66). Thus, the transmission destination IP address 61, transmission destination port number 62, transmission source IP address 63, and transmission source port number 64 are registered into the RTT switch registration table 60. The record unit 25 identifies the switch ID 32 with reference to the switch ID table 30 based on the interface 31 through which the copied SYN packet is inputted, and registers the identified switch ID 32 into the switch ID 65 of the RTT switch registration table 60 (step S66).

When the reception unit 21 of the analyzer device 2 receives the copied SYN packet from the switch 10d, the determination unit 23 searches the RTT switch registration table 60 (step S67) and determines whether information identical with connection establishment information included in the copied SYN packet is already registered in the RTT switch registration table 60. At this point, the determination unit 23 determines that information identical with the connection establishment information included in the copied SYN packet is registered in the RTT switch registration table 60, and the record unit 25 registers the switch ID 32 of a switch 10d identified based on the interface 31 into the switch ID 65 by associating with the connection establishment information (step S68).

(Mirroring Function)

Figure 27:
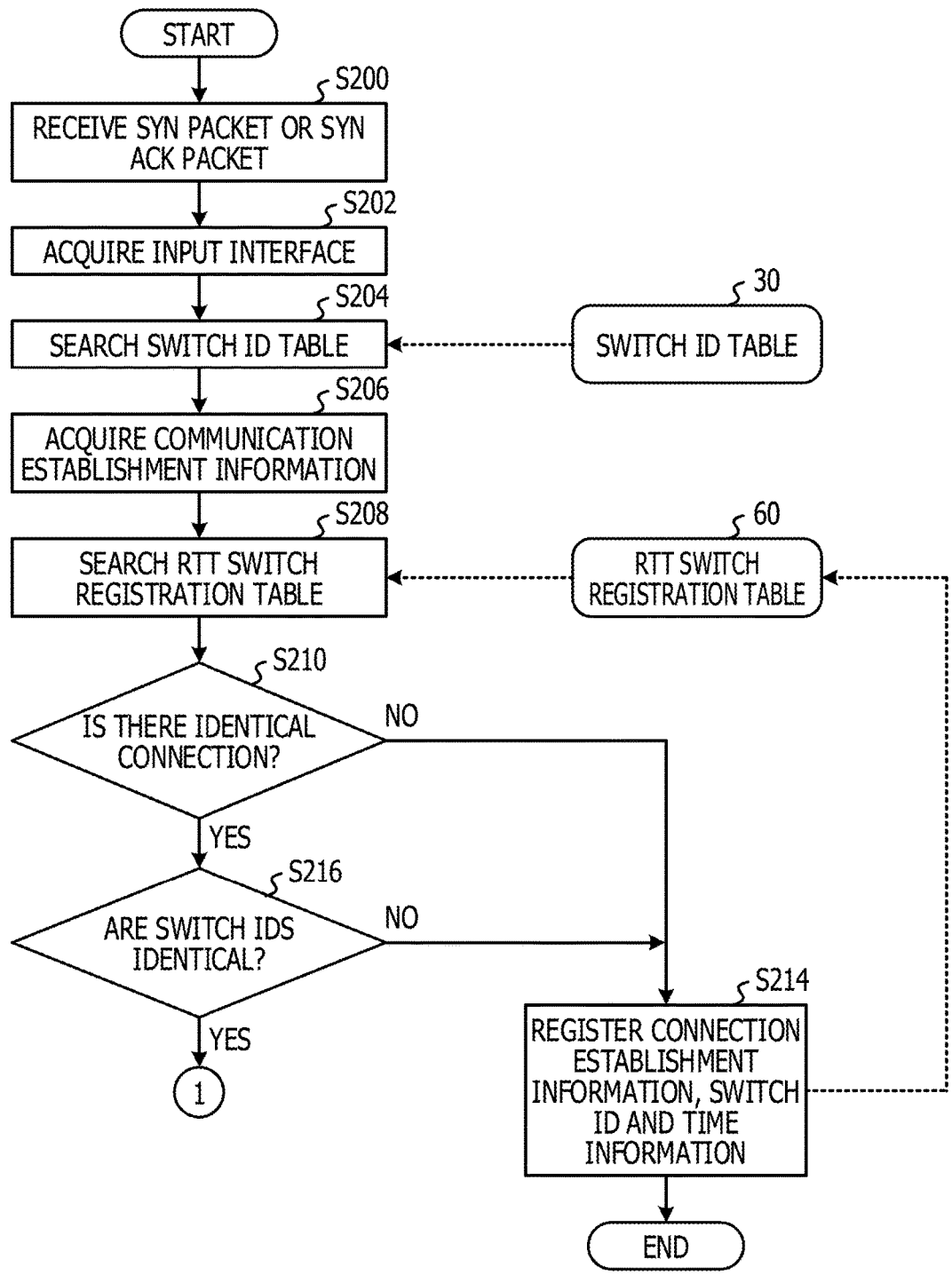
FIG. 27 is a flowchart illustrating an example of a packet processing performed by an analyzer device according to the third embodiment.

Among operations illustrated in FIG. 26, a processing performed by the analyzer device 2 is described with reference to a flowchart of FIG. 27. When the processing is started, the reception unit 21 of the analyzer device receives an SYN packet or an SYN ACK packet (step S200). The SYN packet or SYN ACK packet received by the reception unit 21 of the analyzer device is a packet copied through mirroring by any one of switches as described above. The reception unit 21 is configured to receive a packet. Here, a processing following reception of the received SYN packet or SYN ACK packet is described. The connection management unit 22 acquires information indicating the interface 31 through which the received packet is inputted (step S202). Next, the connection management unit 22 searches the switch ID table 30 and acquires the switch ID 32 based on the interface 31 through which the received packet is inputted (step S204). Next, the connection management unit 22 acquires connection establishment information from the packet (step S206).

The determination unit 23 searches the RTT switch registration table 60 (step S208). When the determination unit 23 determines that connection information identical with the connection establishment information is not registered in the RTT switch registration table 60 (step S210), the record unit 25 registers the connection establishment information, switch ID and time information of the time point when the packet is received into the RTT switch registration table 60 (step S214).

Figure 29:
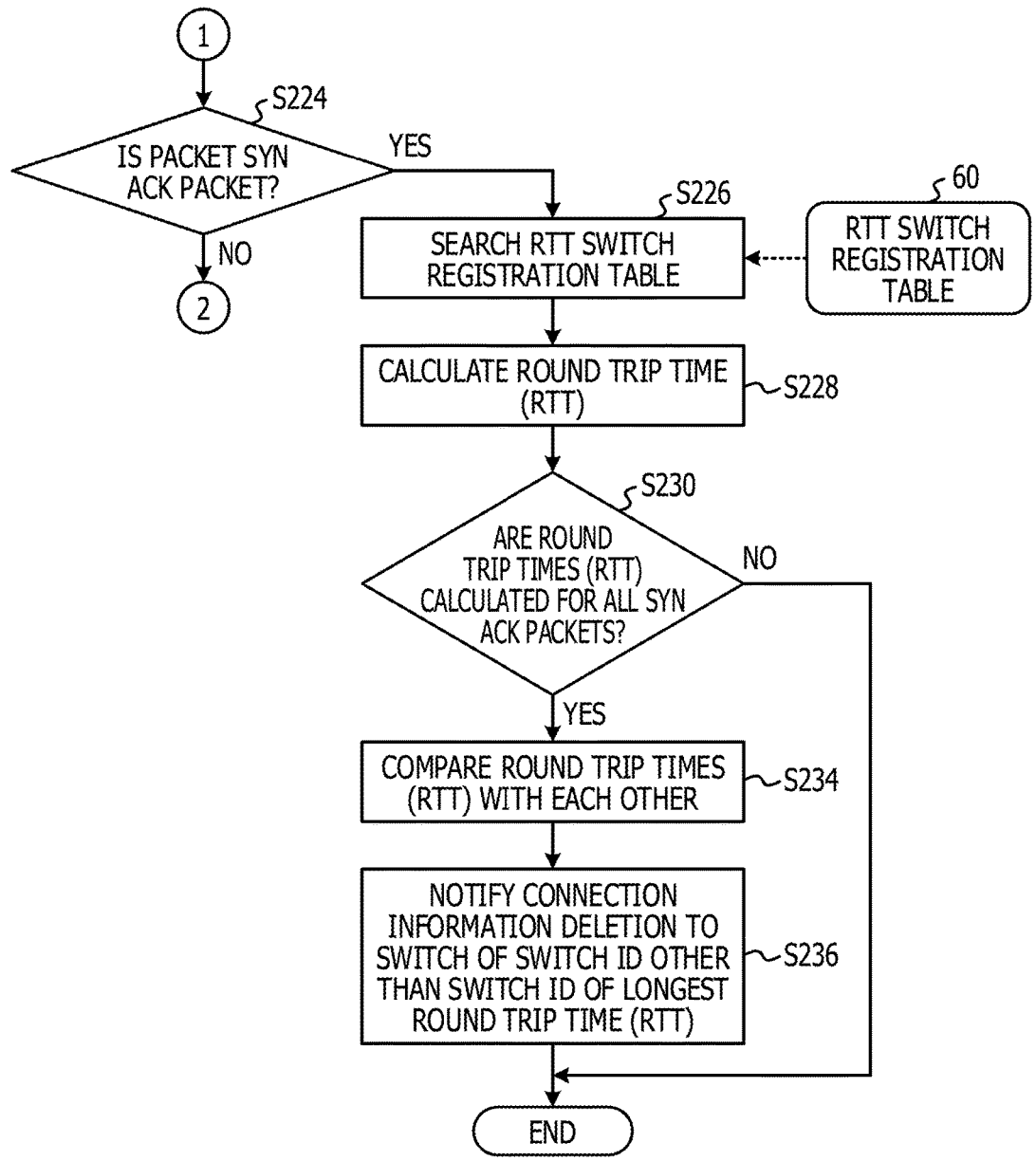
FIG. 29 is a flowchart illustrating an example of a RTT calculation processing performed by the analyzer device according to the third embodiment.

When the determination unit 23 determines in the step S210 that connection information identical with the connection establishment information is recorded in the RTT switch registration table 60 and switch IDs are identical with each other (step S216), the processing proceeds to a terminal "1" of FIG. 29. Meanwhile, when the determination unit 23 determines in the step S210 that connection information identical with the connection establishment information is recorded in the RTT switch registration table 60 and switch IDs are different from each other (step S216), the record unit 25 registers the connection establishment information, switch ID and time information of the time point when the packet is received into the RTT switch registration table 60 (step S214), and the processing ends.

[Calculation of RTT]

Figure 28:
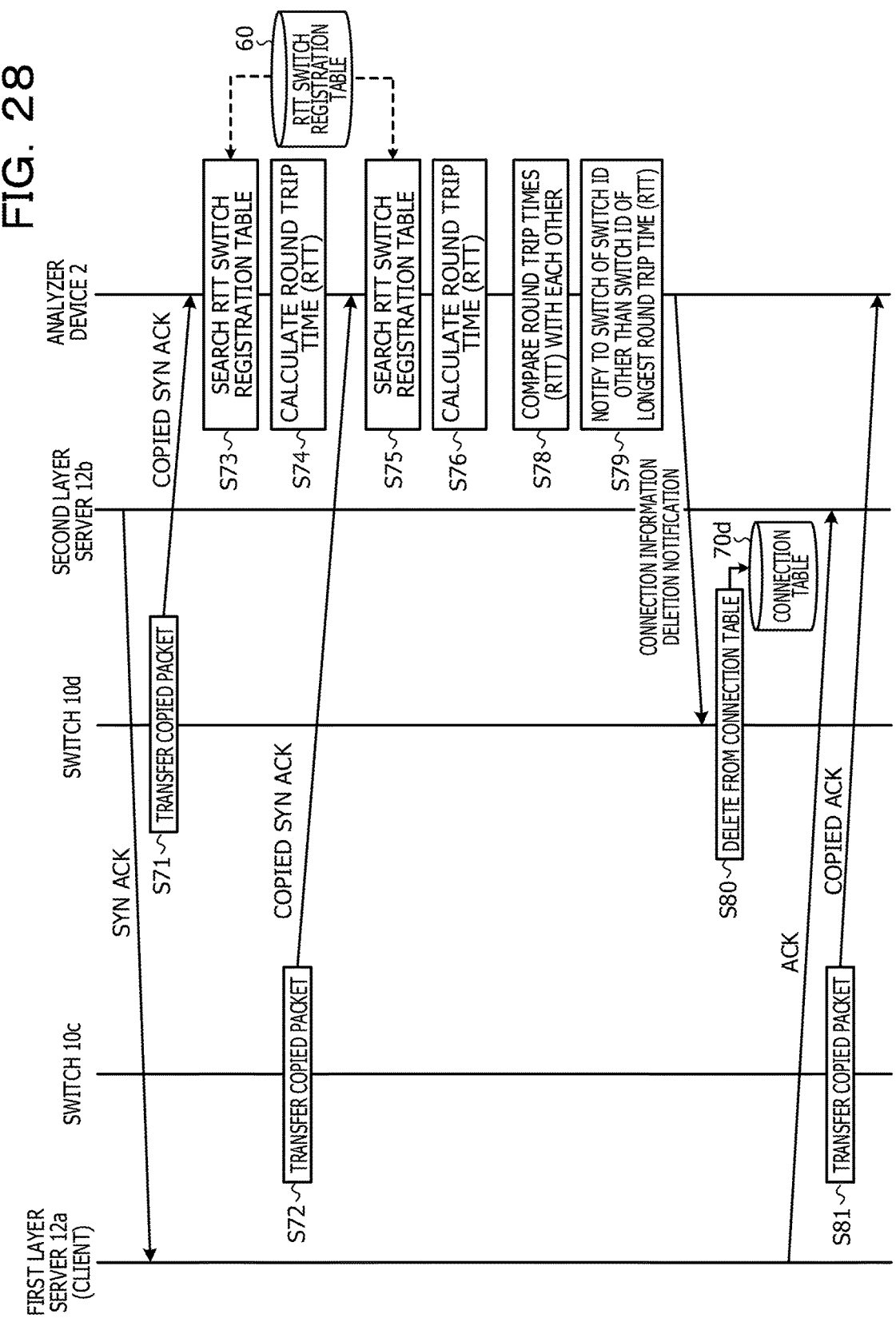
FIG. 28 is a time chart illustrating an example of mirroring of a packet according to the third embodiment.

Next, a RTT calculation processing in the information processing system 1 according to the third embodiment is described with reference to FIG. 28. An SYN ACK packet is transmitted from the second layer server 12b to the first layer server 12a. When the switch 10d receives the SYN ACK packet, the transmission unit 16 of the switch 10d transfers a copied SYN ACK packet to the analyzer device 2 (step S71). Similarly, upon receiving the SYN ACK packet, the transmission unit 16 of the switch 10c transfers the copied SYN ACK packet to the analyzer device 2 (step S72).

The determination unit 23 searches the RTT switch registration table 60 (step S73) and detects content information corresponding to the copied SYN ACK packet received from the switch 10d and time information of the corresponding switch ID from the RTT switch registration table 60. The calculation unit 24 determines the RTT of the switch 10d by calculating a difference between time information (time information of a time point when the copied SYN packet is received) of the time point when detected from the RTT switch registration table 60 and time information of a time point when the copied SYN ACK packet is received from the switch 10d (step S74).

The determination unit 23 searches the RTT switch registration table 60 (step S75) and detects content information corresponding to the copied SYN ACK packet received from the switch 10c and time information of the corresponding switch ID from the RTT switch registration table 60. The calculation unit 24 determines the RTT of the switch 10c by calculating a difference between time information of the time point when the copied SYN packet is received and time information of the time point when the copied SYN ACK packet is received from the switch 10c (step S76).

The calculation unit 24 compares values of the RTT for all calculated switches with each other (step S78). Next, the notification unit 26 sends the connection information deletion notification to switches indicated by switch IDs other than the switch ID of the largest RTT value (step S79). In the example of FIG. 28, RTT for the switch 10c is determined as being longest as a result of the RTT comparison, and the connection information deletion notification is transmitted to the switch 10d. Upon receiving the connection information deletion notification, he switch 10d deletes connection information designated by the connection information deletion notification from the connection table 70d (step S80).

Next, when the ACK packet is transmitted from the first layer server 12a to the second layer server 12b, the transmission unit 16 of the switch 10c receives the ACK packet and transfers a copied ACK packet to the analyzer device 2 (step S81). Since the corresponding connection information is already deleted from the connection table 70d of the switch 10d, the copied ACK packet is not transmitted from the transmission unit 16 of the switch 10d.

(RTT Calculation Function)

Among operations illustrated in FIG. 28, a processing performed by the analyzer device 2 is described with reference to a flowchart of FIG. 29. When the processing following a terminal "1" of FIG. 29 is started, the determination unit 23 of the analyzer device 2 determines whether the received copied packet is an SYN ACK packet (step S224).

Figure 31:
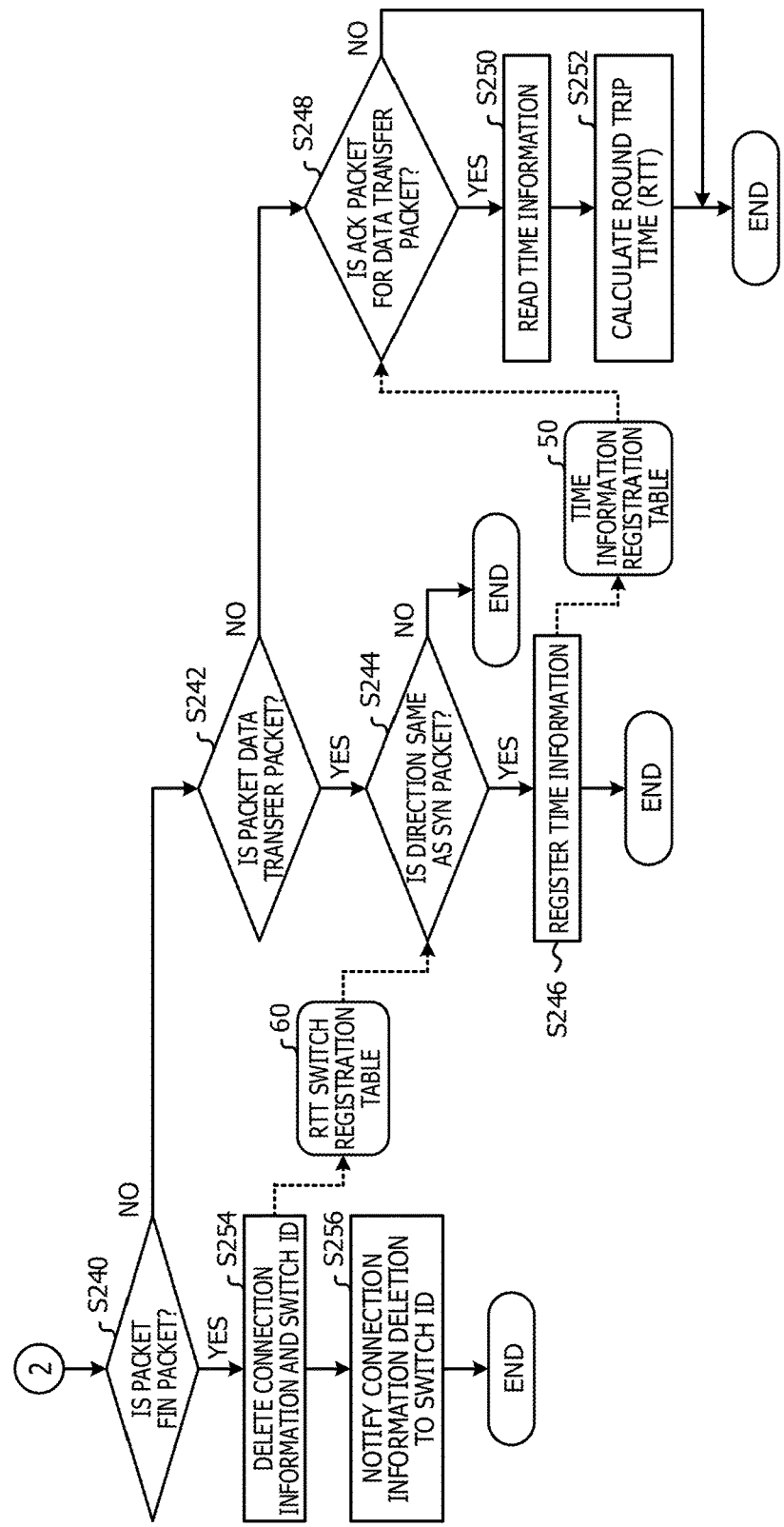
FIG. 31 is a flowchart illustrating an example of the RTT calculation processing performed by the analyzer device according to the third embodiment.

When the determination unit 23 determines that the copied packet is not the SYN ACK packet, the processing proceeds to a terminal "2" of FIG. 31. When determined that the copied packet is the SYN ACK packet, the determination unit 23 searches the RTT switch registration table 60 (step S226) and detects content information corresponding to the copied SYN ACK packet received from the switch 10 and time information corresponding to the switch ID from the RTT switch registration table 6. The calculation unit 24 calculates the difference between time information detected from the RTT switch registration table 60 and time information of a time point when the copied SYN ACK packet is received, as RTT at the position of the switch 10 (step S228).

The calculation unit 24 determines whether RTT for the switch is calculated for all the copied SYN ACK packets (step S230). If RTT is not calculated for all the copied SYN ACK packets, the processing ends. If RTT is calculated for all the copied SYN ACK packets, the calculation unit 24 compares values of all RTTs (step S234). Next, the notification unit 26 transmits the connection information deletion notification to a switch identified by a switch ID other than the switch ID of the longest RTT (step S236), and the processing ends.

[Calculation of RTT]

Figure 30:
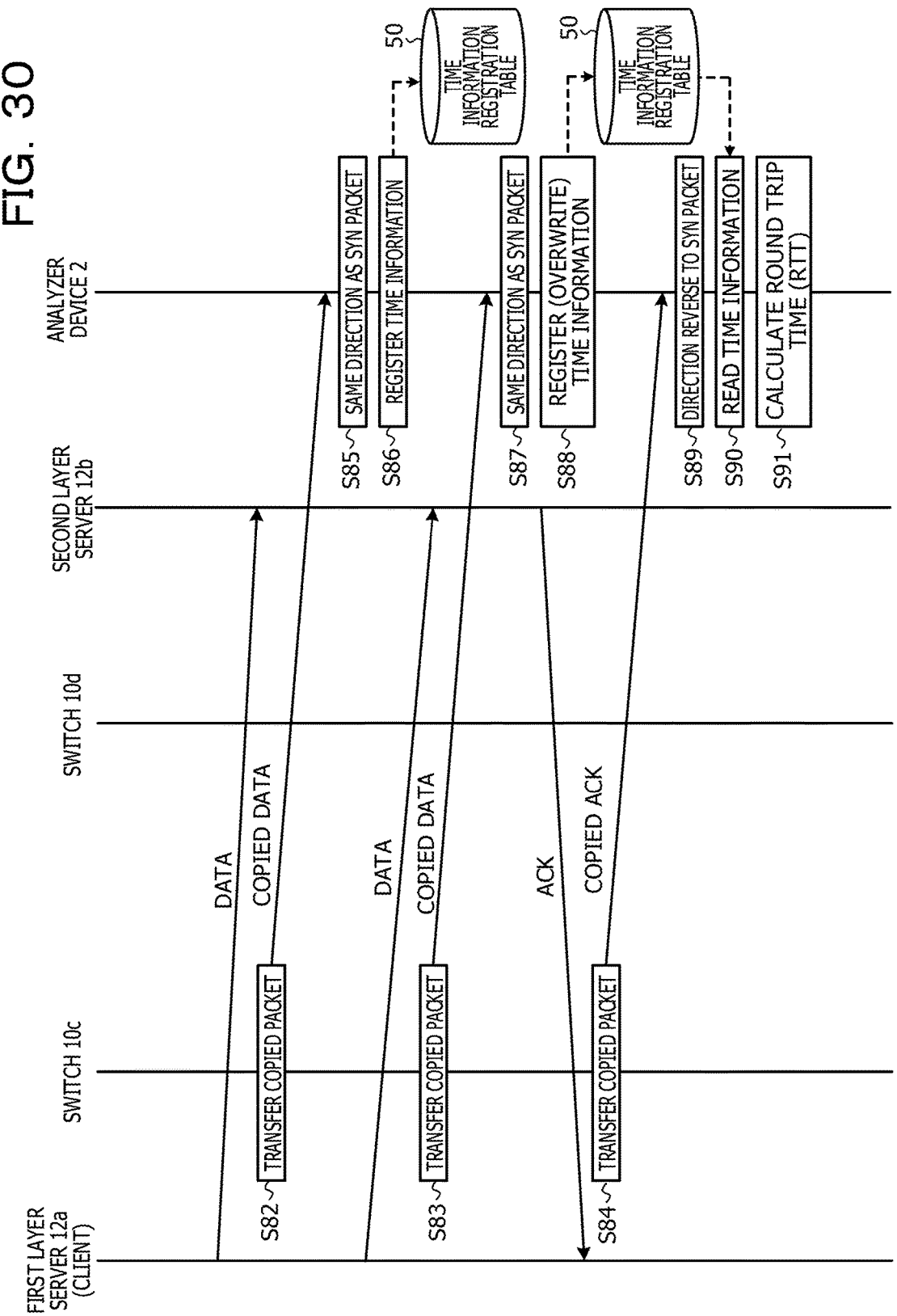
FIG. 30 is a time chart illustrating an example of mirroring of a packet according to the third embodiment.

Next, a RTT calculation processing in the information processing system 1 according to the third embodiment is described with reference to FIG. 30. Every time the data transfer packet is transmitted from the first layer server 12a to the second layer server 12b, a copied data transfer packet is transferred from the switch 10c to the analyzer device 2 (steps S82, S83).

The reception unit 21 of the analyzer device 2 receives the copied data transfer packet transmitted from the switch 10c. The determination unit 23 determines based on the connection information included in the copied data transfer packet whether direction of the transmission source and the transmission destination of the received copied data transfer packet is the same as the copied SYN packet (steps S85, S87). Here, since the direction is the same, the record unit 25 overwrites information of the reception time of the copied data transfer packet into the time information 56 of the time information registration table 50 (steps S86, S88).

When the ACK packet is transmitted from the second layer server 12b to the first layer server 12a, a copied ACK packet is transferred from the switch 10c to the analyzer device 2 (step S84).

The determination unit 23 of the analyzer device 2 determines that directions of the transmission source and transmission destination of the received copied ACK packet and copied SYN packet are reverse to each other (step S89). The calculation unit 24 reads time information 56 of the corresponding connection information from the time information registration table 50 (step S90) and calculates the RTT from a difference between time information of the time point when the copied ACK packet is received and read time information 56 (step S91).

(RTT Calculation Function)

Among operations illustrated in FIG. 30, a processing performed by the analyzer device 2 is described with reference to a flowchart of FIG. 31. When the processing following a terminal "2" of FIG. 29 is started, the determination unit 23 of the analyzer device 2 determines whether the received copied packet is a FIN packet (step S240).

When determined that the received copied packet is not the FIN packet, the determination unit 23 determines whether the copied packet is a data transfer packet (step S242). When determined that the copied packet is the data transfer packet, the determination unit 23 determines whether direction of the copied packet is the same as the SYN packet (step S244). When determined that direction of the copied packet is not the same as the SYN packet, the processing ends. Meanwhile, when determined that direction of the copied packet is the same as the SYN packet, the record unit 25 registers a time point when the copied packet is received into the time information 56 of the time information registration table 50 (step S246), and the processing ends.

In the step S242, when determined that the copied packet is not the data transfer packet, the determination unit 23 determines whether the received copied packet is an ACK packet for the data transfer packet (step S248). When determined that the copied packet is not the ACK packet, the processing ends. When determined that the copied packet is the ACK packet, the calculation unit 24 reads out time information 56 of the corresponding connection information from the time information registration table 50 (step S250). The calculation unit 24 calculates the RTT from a difference between time information of the time point when the copied packet is received and read time information 56 (step S252), and the processing ends. A processing following the determination in the step S240 that the copied packet is the FIN packet is described later.

[Disconnection of Connection]

Figure 32:
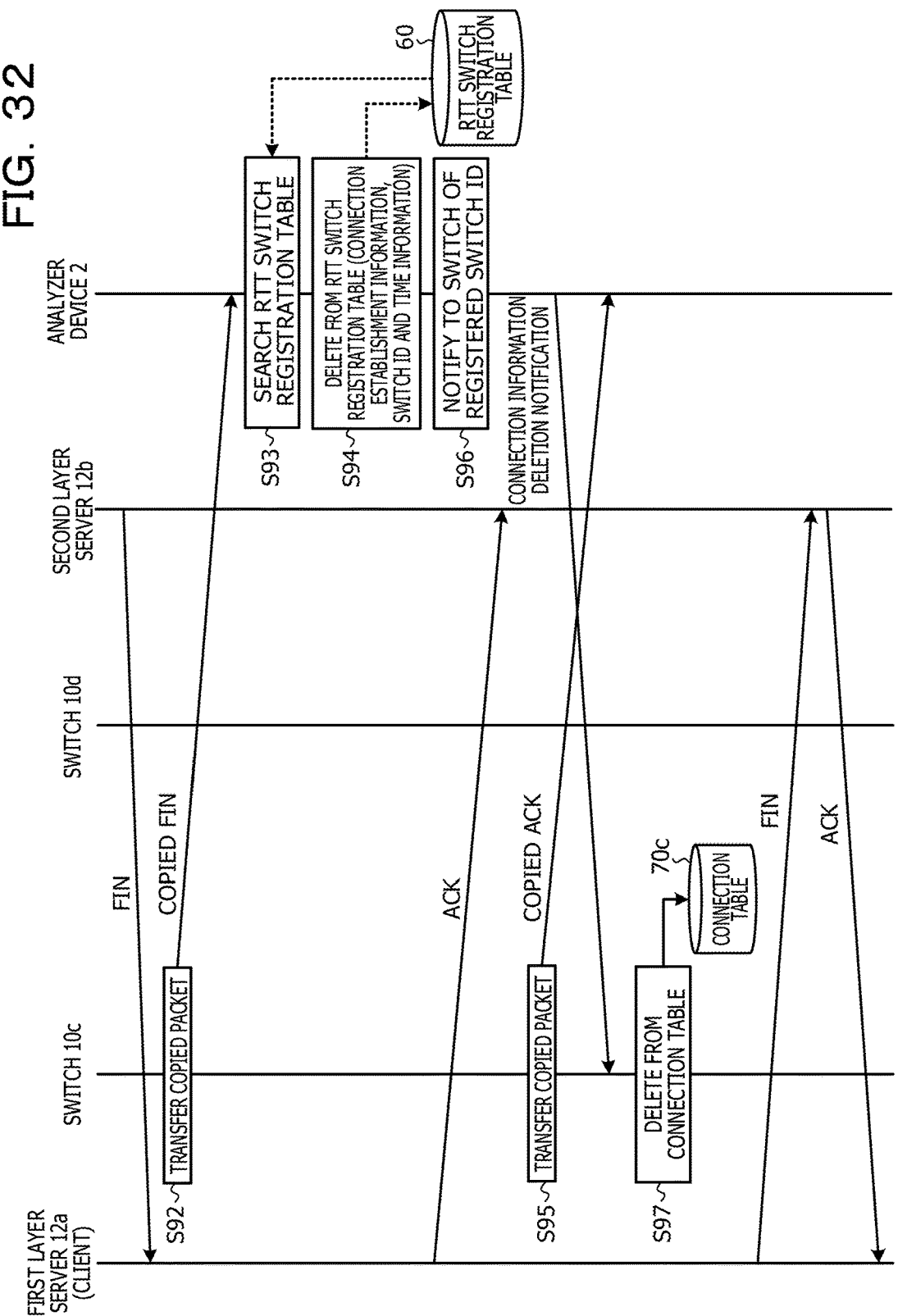
FIG. 32 is a time chart illustrating an example of mirroring of a packet according to the third embodiment.

Next, a processing of disconnecting the connection in the information processing system 1 according to the third embodiment is described with reference to FIG. 32. A FIN packet is transmitted from the second layer server 12b to the first layer server 12a. The reception unit 14 of the switch 10c receives a FIN packet. The transmission unit 16 of the switch 10c transfers a copied FIN packet to the analyzer device 2 (step S92).

When the analyzer device 2 receives the copied FIN packet, the determination unit 23 searches the RTT switch registration table 60 (step S93). The record unit 25 deletes the searched-out connection information identical with the connection information included in the copied FIN packet, switch ID and time information from the RTT switch registration table 60 (step S94). Thus, the transmission destination IP address 61, transmission destination port number 62, transmission source IP address 63, transmission source port number 64, switch ID, and time information of the corresponding connection information are deleted from the RTT switch registration table 60 (FIG. 10).

The switch 10c transfers the copied ACK packet for the received FIN packet (step S95). The notification unit 26 transmits the connection information deletion notification to a switch 10c identified by a deleted switch ID (step S96). The switch 10c receives the connection information deletion notification, and the record unit 17 deletes the corresponding connection information from the connection table 70c (step S97). Thus, mirroring by the switch 10 for the connection corresponding to the connection information designated by the connection information deletion notification is ended.

A processing of the analyzer device 2 performed when connection is disconnected is described with reference to FIG. 31. When the reception unit 21 of the analyzer device 2 receives the copied FIN packet, the determination unit 23 determines in the step S240 that the packet is a FIN packet. In this case, the record unit 25 deletes connection information logically identical with information on the transmission source and transmission destination included in the copied FIN packet, and the switch ID from the RTT switch registration table 60 (step S254). Next, the notification unit 26 transmits the connection information deletion notification to a switch 10 identified by the deleted switch ID (step S256), and the processing ends.

As described above, the information processing system 1 according to the third embodiment measures the RTT of the switch 10c when detecting establishment of the connection. Thereafter, when establishment of an identical connection is detected by a switch 10d other than a switch 10c which has measured the RTT, the RTT for the switch 10d is measured. When all RTTs are measured, all RTTs are compared with each other, and a notification to delete connection information is sent to switches other than the switch of the largest RTT value. Thus, switches other than a switch of the largest RTT value are controlled such that the established connection is not recognized as a connection of the mirroring target. Thus, transferring copied packets in duplicate by multiple switches 10 to the analyzer device 2 is avoided. When a mirroring is performed by a switch 10c of a largest RTT value, mirroring by a switch 10 closest to the client 13 or server 12 is implemented.

For example, when a data packet is transmitted from the client 13 to the server 12, reception time information of each of the data packet mirrored by a switch closest to the client 13 and the ACK packet for the data packet is calculated from the RTT. Thus, the RTT is measured accurately.

When a data packet is transmitted from the server 12 to the client 13, reception time information of each of the data packet mirrored by a switch closest to the server 12 and the ACK packet for the data packet is calculated from the RTT. Thus, the RTT is measured accurately.

In the above embodiment, the connection information deletion notification is transmitted to switches other than the switch of the largest calculated RTT value. However, the present disclosure is not limited thereto. For example, the connection information deletion notification may be transmitted to a switch other than any one of switches of a calculated RTT value larger than a predetermined threshold value.

Although packet acquisition methods, analyzer devices, relay devices and programs according to the above embodiments are described, packet acquisition methods, analyzer devices, relay devices and programs according to the present disclosure are not limited thereto, and may be modified and improved in various manners within a scope of the present disclosure. Two or more embodiments or modified examples, if any, may be combined with each other within a non-conflicting scope.

For example, the switch ID is an example of identification information of the relay device. However, identification information of the relay device is not limited thereto so long as identification information of the relay device is information from which the relay device may be identified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method executed in a network system including a plurality of relay devices and an analyzer device, each of the plurality of relay devices including a first memory, the analyzer device including a second memory configured to store one or more of connection information, the method comprising:
   receiving, by any of the plurality of relay devices, a packet for establishing a connection, the received packet including the connection information related to the connection;
   storing, by the any of the plurality of relay devices, the connection information included in the received packet into the first memory of the any of the plurality of relay devices;
   generating, by the any of the plurality of relay devices, a copied packet by copying the received packet;
   transmitting, by the any of the plurality of relay devices, the generated copied packet to the analyzer device;
   receiving, by the analyzer device, a plurality of copied packets including the generated copied packet from the any of the plurality of relay devices, the plurality of received copied packets respectively including the connection information;
   determining, by the analyzer device, for each of the plurality of copied packets, whether the connection information included in the received copied packet matches with any of the one or more of connection information stored in the second memory of the analyzer device;

when it is determined that the connection information included in the received copied packet does not match with any of the one or more of connection information stored in the second memory, considering a source relay device from which the received copied packet is received as a first relay device, and storing the connection information of the received copied packet in association with identifier of the first relay device into the second memory of the analyzer device;

when it is determined that the connection information included in the received copied packet matches with any of the one or more of connection information stored in the second memory, considering the source relay device as a second relay device, and transmitting, from the analyzer device to the second relay device, instruction information for instructing not to transmit the copied packet associated with the connection information included in the received copied packet; and in response to reception of the instruction information, deleting, by the second relay device, the connection information indicated by the instruction information from the first memory of the second relay device.

2. The method according to claim 1, wherein
the connection information includes information on a transmission source and a transmission destination of the received packet.

3. The method according to claim 2,
wherein the connection information includes a network address and a port number of each of the transmission source and the transmission destination.

4. The method according to claim 3, wherein
when the connection information included in the copied packet is recorded in the second memory and one of the plurality of relay devices each being the transmission source of the copied packet is different from the second relay device indicated by the identification information associated with the connection information in the second memory, the determining determines that the received connection information is stored in the second memory.

5. The method according to claim 1, wherein
the receiving the packet includes receiving a first packet and a second packet indicating that the first packet is transmitted correctly,
the generating includes generating a first copied packet and a second copied packet by copying the first packet and the second packet, and
the transmitting includes transmitting the first copied packet and the second copied packet to the analyzer device,
the method further comprising:
calculating a round trip time based on a time point when the first copied packet is received and a time point when the second copied packet is received.

6. The method according to claim 5, wherein
the calculating includes calculating the round trip time for each of the plurality of relay devices,
the method further comprising:
comparing each of the calculated round trip times corresponding to the plurality of relay devices with another round trip time among the calculated round trip times; and identifying the second relay device among the plurality of relay devices which is determined to satisfy a predetermined condition based on the comparing.

7. The method according to claim 6, wherein
the predetermined condition is that the second relay device is a relay device corresponding to a round trip time other than the longest round trip time among the calculated round trip times.

8. The method according to claim 3,
wherein the determining includes determining that the received connection information is stored in the second memory when the connection information corresponding to another relay device which is a same as the received connection information, the another relay device being different from the transmission source, is stored in the second memory.

9. A network system comprising:
a plurality of relay devices and an analyzer device, each of the plurality of relay devices including a first memory;
the analyzer device including a second memory configured to store one or more of connection information and a processor coupled to the second memory,
wherein any of the plurality of relay devices is configured to:
receive a packet for establishing a connection, the received packet including the connection information related to the connection,
store the connection information included in the received packet into the first memory,
generate a copied packet by copying the received packet,
transmit the generated copied packet to the analyzer device, and
wherein the processor of the analyzer device is configured to:
receive, by the analyzer device, a plurality of copied packets including the generated copied packet from the any of the plurality of relay devices, the plurality of received copied packets respectively including the connection information,
determine, by the analyzer device, for each of the plurality of copied packets, whether the connection information included in the received copied packet matches with any of the one or more of connection information stored in the second memory of the analyzer device,
when it is determined that the connection information included in the received copied packet does not match with any of the one or more of connection information stored in the second memory, consider a source relay device from which the received copied packet is received as a first relay device, and store the connection information of the received copied packet in association with identifier of the first relay device into the second memory of the analyzer device,
when it is determined that the connection information included in the received copied packet matches with any of the one or more of connection information stored in the second memory, consider the source relay device as a second relay device, and transmit, from the analyzer device to the second relay device, instruction information for instructing not to transmit the copied packet associated with the connection information included in the received copied packet, and wherein the second relay device is configured to:
receive the instruction information, and
delete the connection information indicated by the instruction information from the first memory of the second relay device.

10. The network system according to claim 9, wherein the connection information includes information on a transmission source and a transmission destination of the received packet.

11. The network system according to claim 10, wherein the connection information includes a network address and a port number of each of the transmission source and the transmission destination.

12. The network system according to claim 11, wherein the processor is configured to:
when the connection information included in the copied packet is recorded in the second memory and one of the plurality of relay devices each being the transmission source of the copied packet is different from the second relay device indicated by the identification information associated with the connection information in the second memory, determine that the received connection information is stored in the second memory.

13. The network system according to claim 9, wherein the any of the plurality of relay devices is configured to:
receive a first packet and a second packet indicating that the first packet is transmitted correctly,
generate a first copied packet and a second copied packet by copying the first packet and the second packet, and
transmit the first copied packet and the second copied packet to the analyzer device,
the processor is configured to:
calculate a round trip time based on a time point when the first copied packet is received and a time point when the second copied packet is received.

14. The network system according to claim 13, wherein the processor is configured to:
calculate the round tip time for each of the plurality of relay devices,
compare each of the calculated round trip times corresponding to the plurality of relay devices with another round trip time among the calculated round trip times, and
identify the second relay device among the plurality of relay devices which is determined to satisfy a predetermined condition based on the comparison.

15. The network system according to claim 14, wherein the predetermined condition is that the second relay device is a relay device corresponding to a round trip time other than the longest round trip time among the calculated round trip times.

* * * * *